United States Patent
Kurosawa et al.

(10) Patent No.: US 8,949,572 B2
(45) Date of Patent: Feb. 3, 2015

(54) EFFECTIVE ADDRESS CACHE MEMORY, PROCESSOR AND EFFECTIVE ADDRESS CACHING METHOD

(75) Inventors: Yasuhiko Kurosawa, Kanagawa (JP); Shigeaki Iwasa, Kanagawa (JP); Seiji Maeda, Kanagawa (JP); Nobuhiro Yoshida, Tokyo (JP); Mitsuo Saito, Kanagawwa (JP); Hiroo Hayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1066 days.

(21) Appl. No.: 12/580,732

(22) Filed: Oct. 16, 2009

(65) Prior Publication Data

US 2010/0100685 A1    Apr. 22, 2010

(30) Foreign Application Priority Data

Oct. 20, 2008    (JP) ................. 2008-269940

(51) Int. Cl.
 *G06F 12/10*    (2006.01)
(52) U.S. Cl.
 CPC ................. *G06F 12/1054* (2013.01)
 USPC .............................. 711/207; 711/3
(58) Field of Classification Search
 USPC .................................. 711/200–210
 See application file for complete search history.

(56) References Cited

U.S. PATENT DOCUMENTS 5,241,641 A     8/1993   Iwasa et al.
5,377,339 A    12/1994   Saito et al.
5,522,058 A     5/1996   Iwasa et al.
5,530,824 A  *  6/1996   Peng et al. ................. 711/207
5,617,553 A     4/1997   Minagawa et al.
5,634,027 A     5/1997   Saito
5,682,495 A  * 10/1997   Beavers et al. ............. 711/207
5,826,057 A    10/1998   Okamoto et al.
5,829,032 A    10/1998   Komuro et al.
5,881,264 A     3/1999   Kurosawa
5,890,189 A     3/1999   Nozue et al.
6,088,773 A     7/2000   Kano et al.
6,161,166 A  * 12/2000   Doing et al. ................ 711/125
6,412,043 B1 *  6/2002   Chopra et al. .............. 711/118

(Continued)

FOREIGN PATENT DOCUMENTS

CN    1820258 A    8/2006
JP    03-083150    4/1991
JP    04-235648    8/1992
JP    04-328655   11/1992

OTHER PUBLICATIONS

Jacob, Bruce, and Trevor Mudge. "Virtual memory in contemporary microprocessors." Micro, IEEE 18.4 (1998): 60-75.*

(Continued)

*Primary Examiner* — April Y Blair
*Assistant Examiner* — Nicholas Simonetti
(74) *Attorney, Agent, or Firm* — Sprinkle IP Law Group

(57) ABSTRACT

An effective address cache memory includes a TLB effective page memory configured to retain entry data including an effective page tag of predetermined high-order bits of an effective address of a process, and output a hit signal when the effective page tag matches the effective page tag from a processor; a data memory configured to retain cache data with the effective page tag or a page offset as a cache index; and a cache state memory configured to retain a cache state of the cache data stored in the data memory, in a manner corresponding to the cache index.

20 Claims, 15 Drawing Sheets

(56) References Cited

U.S. PATENT DOCUMENTS

| | | | |
|---|---|---|---|
| 6,418,515 | B1 | 7/2002 | Kurosawa |
| 6,493,790 | B1* | 12/2002 | Khieu et al. ............... 711/108 |
| 2005/0027960 | A1* | 2/2005 | DeMent et al. ............. 711/207 |
| 2005/0108497 | A1* | 5/2005 | Bridges et al. ............. 711/207 |
| 2006/0026384 | A1* | 2/2006 | Brandt et al. ............... 711/209 |
| 2007/0094475 | A1* | 4/2007 | Bridges et al. ............. 711/207 |
| 2008/0229036 | A1 | 9/2008 | Maeda et al. |
| 2008/0256296 | A1 | 10/2008 | Maeda |
| 2009/0019266 | A1 | 1/2009 | Maeda |

OTHER PUBLICATIONS

Office Action for Chinese Patent Application No. 200910205038.1, issued on Jun. 2, 2011, Chinese Patent Office, 4 pgs.

"Computer Organization and Design, the Hardware/Software Interface", David A. Patterson et al., Third revised printing, Morgan Kaufmann Publishers, 2007, pp. 466-555.

"Computer Architecture, A Quantitative Approach", John L. Hennessy et al., Forth Edition, Morgan Kaufmann Publishers, 2007, pp. 286-354 and pp. C-1-C-57.

"Parallel Computer Architecture, A Hardware/Software Approach," David Culler et al., Morgan Kaufmann Publishers, Aug. 15, 1998, pp. 276-393.

"IBM PowerPC 970 FX RISC MicroProcessor User's Manual" IBM, Mar. 14, 2008, pp. 17-25 and pp. 129-160.

Office Action with English language translation for Japanese Patent Application No. 2008-269940, issued on Nov. 6, 2012, Japanese Patent Office, 7 pgs.

Office Action (with English translation) for Japanese Patent Application No. 2008-269940, mailed Feb. 26, 2013, 5 pgs.

* cited by examiner

EFFECTIVE ADDRESS CACHE MEMORY, PROCESSOR AND EFFECTIVE ADDRESS CACHING METHOD

CROSS-REFERENCE TO RELATED APPLICATION

This application is based upon and claims the benefit of priority from the prior Japanese Patent Application No. 2008-269940 filed in Japan on Oct. 20, 2008; the entire contents of which are incorporated herein by reference.

BACKGROUND OF THE INVENTION

1. Field of the Invention

The present invention relates to an effective address cache memory, a processor and an effective address caching method, and more particularly to an effective address cache memory, a processor and an effective address caching method for a processor configured to support an effective storage.

2. Description of the Related Art

Conventionally, in a processor configured to employ an effective storage, in order to execute address translation at high speed from an effective address space which is an address space unique to a process, to a real address space which is an address space of an entire computer system in which the processor is mounted, a TLB (Translation Lookaside Buffer) which is a dedicated cache memory configured to place a copy of a page table managed by an operating system (hereinafter, referred to as "OS") is mounted.

On the other hand, in order to hide latency of memory accesses, the processor copies data in a memory to a cache memory (hereinafter, also referred to as "cache") and uses the data. In order to specify an address of the data in the memory which retains the data copied to the cache, the processor has a Tag memory configured to retain the address of the data and a status of the data (whether or not the data is valid, whether or not memory contents have been updated, or the like), in addition to a data memory configured to retain the data in the memory. The tag memory is generally configured to set low-order bits of a memory address as an index of the cache, and to retain high-order bits (Tag) of the memory address and the status of the data, as data.

The above described address translation often becomes a critical path in terms of timing in processor design. If the processor employs a hierarchical memory, a configuration may often be employed in which a level 1 cache (hereinafter, also referred to as "L1 cache") positioned near the processor is accessed by using an effective address, and level 2 (L2 cache) and more caches are accessed by using a real address because of measures against an alias to be described later or the like.

Since the address translation is performed in all the memory accesses caused by fetch of instructions, a load instruction and a store instruction, performance is more affected by a TLB miss than by a normal cache miss. Thus, the TLB is provided as the dedicated memory separated from the cache.

However, the above described conventional configuration of the TLB and the cache memory has the following problem.

The problem relates to capacities of the TLB, and the tag memory of the cache.

The TLB retains data such as an effective page number, a real page number, a page attribute and a page status, as the data. In a processor having a real address space of 32 bits or more, the effective page number and the real page number have a high proportion of the data retained in the TLB. A size of the TLB mainly depends on a size of the real address space, a minimum page size, and the number of entries in the TLB.

The tag memory of the cache retains data such as the Tag and a cache status, as the data. In the processor having the real address space of 32 bits or more, the Tag has a high proportion of the data retained in the tag memory of the cache. A size of the tag memory of the cache mainly depends on the size of the real address space, a cache line size and a cache capacity.

According to "Computer Architecture—A Quantitative Approach—Third Edition", Figures 5.57 and 5.58 (pages 505 and 506), recent processors are as follows.

A L1 size is 8 kB to 64 kB, direct mapped or 2-way set associative.

The number of TLB entries is 4 to 512 entries, full associative.

The minimum page size is 1 to 64 kB.

Moreover, a basic technique of a cache using an effective address is also disclosed in "Computer Organization and Design—The Hardware/Software interface—second edition" (1998 Morgan Kaufmann: ISBN 1-55860-428-6) by David. A. Patterson and John L. Hennessy (p 592) Integrating virtual memory, TLB and Caches (p 593) Figure 7.25 (p 594) Figure 7.26, and "Computer Architecture—A Quantitative Approach—third edition" (2003 Morgan Kaufmann: ISBN 1-55860-596-7) by John L. Hennessy and David. A. Patterson (p 444) "Second Hit Time Reduction Technique: Avoiding Address Translation during Indexing of Cache".

BRIEF SUMMARY OF THE INVENTION

According to an aspect of the present invention, it is possible to provide an effective address cache memory including a TLB effective page memory configured to retain entry data including an effective page tag of predetermined high-order bits of an effective address of a process, and output a hit signal when the effective page tag matches the effective page tag from a processor; a data memory configured to retain cache data with the effective page tag or a page offset as a cache index; and a cache state memory configured to retain a cache state of the cache data stored in the data memory, in a manner corresponding to the cache index.

DETAILED DESCRIPTION OF THE INVENTION

Hereinafter, embodiments of the present invention will be described with reference to the drawings.

First Embodiment

Configuration

Figure 1:
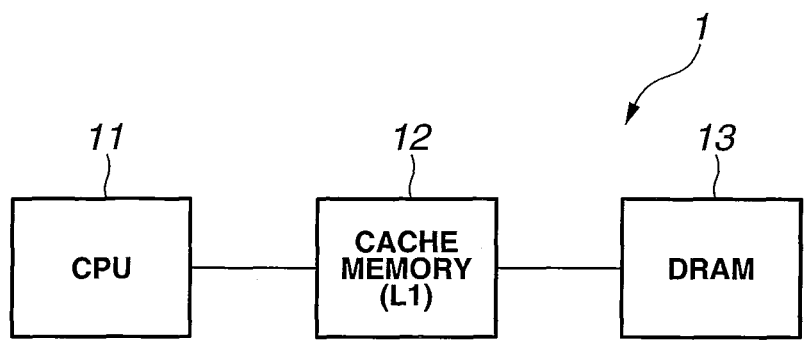
FIG. 1 is a structural diagram showing a configuration of a processor system according to a first embodiment of the present invention.

First, based on FIG. 1, a configuration of a processor system according to a first embodiment of the present invention will be described. FIG. 1 is a structural diagram showing the configuration of the processor system according to the first embodiment of the present invention.

A processor system 1 is configured to have a central processing unit (hereinafter, referred to as "CPU") 11, a level 1 (L1) cache memory 12 as an effective address cache memory, and a DRAM 13 as a main memory. The processor system 1 is a processor having an effective storage mechanism and the cache memory. The cache memory 12 and the DRAM 13 are connected to each other via a bus. The CPU 11 is a so-called CPU core.

It should be noted that although an example in which one CPU 11 accesses the DRAM 13 is provided in the present embodiment, such a multi-core configuration may be employed in which there are a plurality of pairs of the CPU 11 and the cache memory 12, and the plurality of pairs are connected to one DRAM 13 via a system bus or the like.

Furthermore, one or plurality of L2 caches or the like may exist between the cache memory 12 which is the L1 cache and the DRAM 13.

The CPU 11 reads an instruction or data stored in the main memory 13, via the cache memory 12 including a cache memory control circuit, and executes the instruction or the data. If an instruction or data (hereinafter, also simply referred to as "data") required for execution of a program exists in the cache memory, the CPU 11 reads the data from the cache memory 12 and executes the program.

In order to designate the data, the CPU 11 outputs an effective address (EA) to the cache memory 12. If data corresponding to the effective address (EA) inputted into the cache memory 12 exists, the cache memory 12 outputs the data to the CPU 11. If there is no data stored in the cache memory 12, the data is read from the DRAM 13 and written in the cache memory 12 by a refill process, and is outputted to the CPU core 11.

The cache memory 12 of the present embodiment performs cache entry replacement in units of effective pages managed by an OS configured to manage execution of a plurality of processes, and performs cache state management in units of cache lines, that is, in units of cache blocks. In the processor of the present embodiment, accesses to the cache memory 12 which is the L1 cache are performed with the effective address, and cache coherency is provided by a snoop method. As for the snoop method, see "Parallel Computer Architecture—A Hardware/Software Approach—" (1999 Morgan Kaufmann: ISBN 1-55860-343-3) by David. E. Culler, Jaswinder P. Singh and Anoop Gupta, (p. 277) 5.1.2. Cache Coherence through Bus Snooping, (p. 278) Figure 5.4, (p. 380-p. 393) 6.2. Base Design: Single-level Caches with an Atomic Bus, (p. 386) Figure 6.4 and (p. 388) Figure 6.5.

Figure 2:
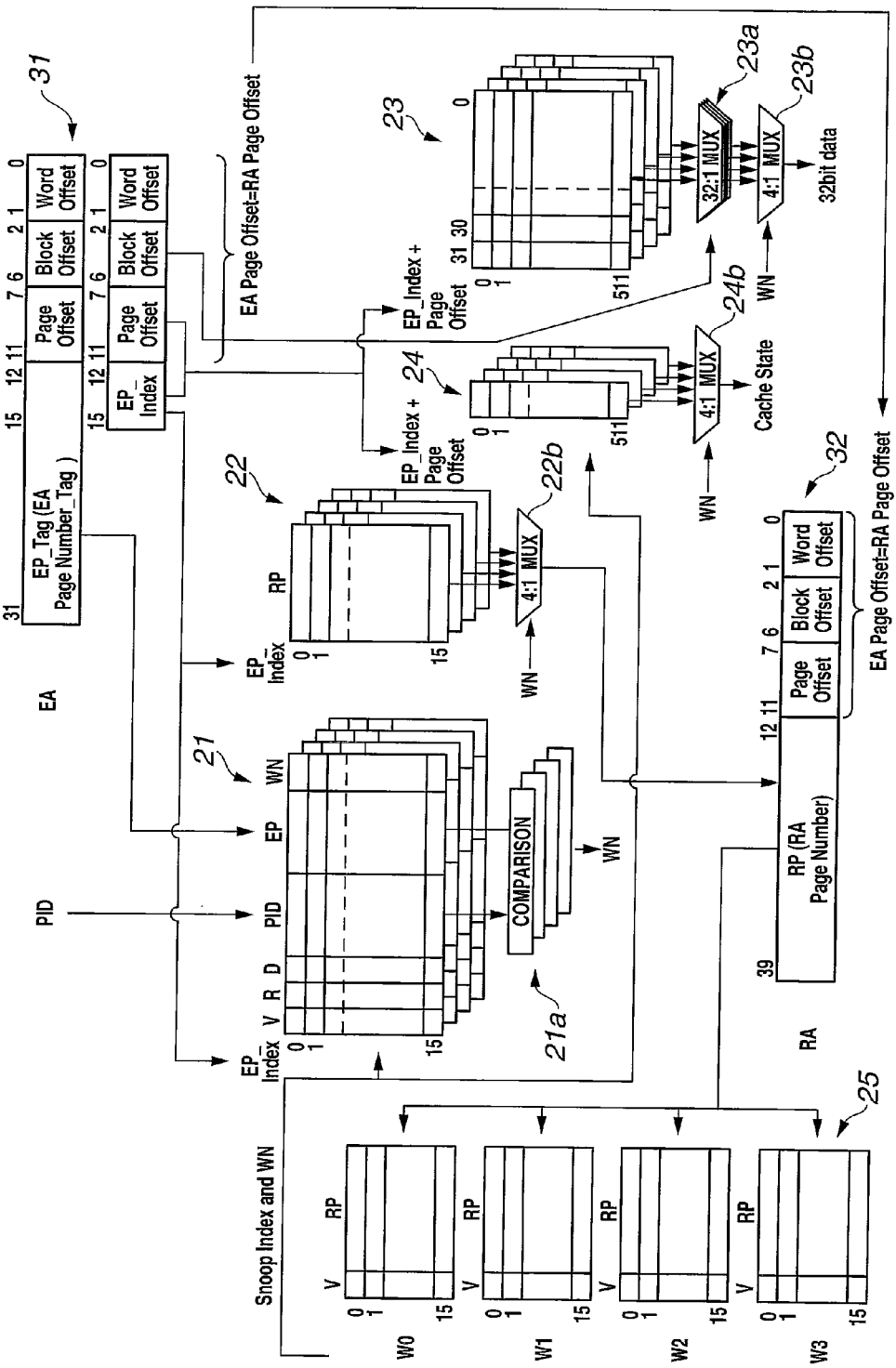
FIG. 2 is a structural diagram of a cache memory as an effective address cache memory according to the first embodiment of the present invention.

FIG. 2 is a structural diagram of the cache memory 12 as the effective address cache memory.

The cache memory 12 is configured to include a TLB effective page memory (TLB EP memory) 21, a TLB real page memory (TLB RP memory) 22, a data memory 23, a cache state memory 24, and a TLB real page CAM memory (TLB RP CAMs memory) 25.

The CPU 11 outputs an effective address (EA) 31 to the cache memory 12. The cache memory 12 outputs a real address 32 to the DRAM 13.

The cache memory 12 of the present embodiment realizes functions as a TLB and the L1 cache, with a cache memory having a 4-way set associative configuration. A capacity of the cache memory 12 as the L1 cache is 256 KB (kilobytes. The same applies to the followings.). Although a size of each way exceeds a page size, page coloring has not been applied to the effective address.

The cache memory 12 of the present embodiment is a 4-way set associative cache in which the effective address (EA) is divided in units of 4 KB pages, high-order bits (31:12) of the effective address EA are set as an effective page tag, and furthermore, middle-order bits (15:12) obtained by dividing 64 KB which is a cache capacity per way by 4 KB are set as an effective page index (EP_Index). In other words, the cache memory 12 constitutes the TLB and the L1 cache. In the present embodiment, since the cache memory 12 as the L1 cache is accessed with the effective address 31, and the size of each way (64 KB) is larger than the page size (4 KB), the effective page tag (EP_Tag) and the effective page index (EP_Index, hereinafter, also referred to as "TLB index") are assigned with bits (31:12) and (15:12) of the effective address (EA), respectively, and are overlapped, as shown in FIG. 2.

The effective address 31 from the CPU 11 is inputted to the cache memory 12. The effective address 31 is composed of 32 bits. The high-order bits (31:12) are the effective page tag (EP_Tag), bits (11:7) are a page offset, bits (6:2) are a block offset, and a least significant bit (1:0) is a word offset. The effective page tag of the high-order bits (31:12) is a tag of an effective page number of the effective address 31.

Moreover, a process number (PID) as an identifier configured to identify a process is also inputted to the cache memory 12 from the CPU 11.

Then, the CPU 11 retrieves data which is equal to or smaller than the cache line size, from the cache memory 12. Here, the CPU 11 retrieves 32-bit data from the cache memory 12.

The TLB effective page memory 21 includes a TLB effective page memory for each way. Each TLB effective page memory can store data such as status information indicating a status of each page, such as Valid (V), Reference (R) or Dirty (D), the process number (PID) as the identifier configured to identify the process, an effective page number (EP) and a way number (WN). The effective page number (EP) is data corresponding to the high-order bits (31:12) in the effective address (EA). It should be noted that, in a current example, since the same value as a way number in the TLB is used for the way number (WN), a field of the way number (WN) may be implemented, or a configuration may be employed in which the field of the way number (WN) is omitted and the way number in the TLB is used for the way number (WN). Moreover, it is assumed that, in a processor of architecture without a process ID, operations of the present embodiment are performed by using only the effective page number, without using the process ID.

Each piece of the data in the TLB effective page memory 21 is designated by 4 bits (15:12) in the high-order bits (31:12) of the effective address (EA) 31, as the TLB index.

Four comparators 21a are provided, which are configured to compare the process number (PID) and the effective page number (EP) in each TLB effective page memory, with the process number (PID) from the CPU 11 and the effective page tag (EP_Tag) in the effective address 31, respectively. The four comparators 21a output the way number (WN) as a hit signal when a hit occurs, and output a non-hit signal when the hit has not occurred, as an output of the TLB effective page memory 21.

The TLB real page memory 22 includes a TLB real page memory for each way. Each piece of data in each TLB real page memory is designated by the effective page index (EP_Index) of the 4 bits (15:12) in the high-order bits (31:12) of the effective address 31, as the TLB index.

The data in the TLB real page memory 22, that is, a real page number corresponds to each way of the TLB effective page memory 21, and the effective page index (EP_Index). An effective address space is managed in units of 4 KB per page.

As will be described later, the data in the TLB real page memory 22 is used in cases of a cache miss and a TLB miss. The TLB real page memory 22 outputs four real address page bits (39:12) corresponding to each way.

The data memory 23 includes a data memory for each way. Each data memory manages each piece of cache data in units of 128 bytes. Each piece of the data in each data memory is designated by 9 bits (15:7) in the effective address 31 as a cache index, and the block offset (6:2). The 9 bits (15:7) consists of the 4 bits (15:12) which are the effective page index (EP_Index), and 5 bits (11:7) which are the page offset.

Then, interchange of the cache data from CPU, that is, loading from or storing to the data memory 23 is performed in units of the word size, or 32 bit. The data exchange with the system bus is performed in the unit of the cache line size.

An output of each data memory is inputted to a corresponding 32-input 1-output multiplexer (32:1 MUX) 23a. A plurality of (here, four) multiplexers 23a as selectors are provided corresponding to the respective data memories. The multiplexer 23a selects the cache data in a block selected based on the block offset (6:2) in the effective address data (EA), from data selected based on the effective page index (EP_Index) and the page offset, and outputs the cache data.

The cache state memory 24 includes a cache state memory for each way. Similarly to the data memory 23, each piece of data in each cache state memory 24 is designated by the 9 bits (15:7) in the effective address 31. The cache state memory 24 is a memory configured to perform the cache state management in units of the cache lines (that is, in units of the cache blocks).

In order to support multitasking, for example, the cache state memory (hereinafter, also referred to as "state memory") 24 stores data of a status of the cache block based on a MESI protocol. In a case of the MESI protocol, data of M (Modified), E (Exclusive), S (Shared) and I (Invalid) is stored.

As for the MESI protocol, see the above-described "Parallel Computer Architecture—A Hardware/Software Approach—" (1999 Morgan Kaufmann: ISBN 1-55860-343-3) by David. E. Culler, Jaswinder P. Singh and Anoop Gupta, (p. 299) 5.3.2. A Four-State (MESI) Write-Back Invalidation Protocol, and (p. 301) Figure 5.15.

Since output data from the cache state memory 24 is data indicating a status of each piece of the data in the data memory 23, that is, whether the data is valid/invalid, whether or not the data is readable, or the like, the output data is inputted to a control circuit (not shown) and used therein.

The TLB real page CAM memory 25 includes a TLB real page CAM (Content Addressable Memory) for each way. Each piece of data in each TLB real page CAM includes the real page number and the status information indicating Valid.

In the TLB real page CAM 25, the data of the real page number has been stored corresponding to each way of the TLB effective page memory 21, and corresponding to the effective page index (EP_Index). The data in the TLB real page CAM 25 is registered when the data is registered in the TLB effective page memory 21.

As will be described later, in order to maintain data coherency with other processors, the TLB real page CAM 25 is used for a required reverse lookup of an effective page from a real page, and for an alias check when the TLB miss occurs. Moreover, the real page registered in the TLB real page CAM 25 is the same as a real page RP registered in the TLB real page memory 22 of a corresponding entry number, and both the TLB real page CAM 25 and the TLB real page memory 22 are accessed much less frequently than the TLB effective page memory 21. Therefore, an implementation may be employed in which a function of the TLB real page memory 22 has been integrated in the TLB real page CAM 25.

An alias problem is a problem in which if the effective address is used for the L1 cache which is larger than the page size, when the same real address is assigned to another effective address, data which originally exists in the cache is handled as a different address, and thus a data mismatch occurs.

In order to prevent the problem, conventionally, two methods have been invented. One method is configured to check all entries which can cause an alias if the TLB miss has occurred, and to flush all the cache lines belonging to the corresponding effective page if the real address has matched.

The other method is a method referred to as "page coloring" which is configured to, with the help of software such as the OS configured to manage the effective address, arrange a plurality of pages to create an address space in which the alias does not occur (for example, in the above described example, sixteen 4 kB pages are arranged so that an area of 256 kB/4 ways=64 kB is created), and prevent the occurrence of the alias in a software manner.

However, in each case, if the same page is shared by the plurality of processes, the TLB miss occurs, and it has been necessary to perform interchange of the TLB entry, and simultaneously, to invalidate all the data belonging to the page used in an old process, on the cache once, and to load the data once again by using a new TLB.

Particularly, the alias problem is problematic because, despite programming intended to share the data among the plurality of processes, shared data is invalidated on the cache once and exactly the same data is loaded to the cache with a new effective address. The problem has caused degradation in performance in the corresponding process and the entire system, and increased power consumption.

Moreover, the real address (RA) flowing, that is, outputted through the bus connected to the DRAM 13 is monitored by the so-called snoop method, and is inputted to the TLB real page CAM 25. If the real address having the same page number as the real page number registered in the TLB real page CAM 25 is detected among the monitored, that is, inputted real addresses (RA), status data indicating a status of the cache state memory 24 indicated by the same entry number as the entry number of the matched TLB real page CAM 25 is changed. In other words, consistency of the status of the cache state memory 24 indicating statuses of the cache lines can be maintained for all the cache lines having the same real address, by applying a cache coherency mechanism of the well-known snoop method. Moreover, due to the snoop, in a case where the data output from the cache is required by a coherence protocol, such as a case where the cache has data newer than the data recorded in the DRAM as in the Modified status of the MESI protocol, the data memory 23 indicated by the same entry number as the entry number of the TLB real page CAM 25 is accessed, and the data is outputted to the bus. As described above, the TLB real page CAM 25 is used in a process configured to maintain the coherency.

Moreover, when the plurality of processes are executed, if the TLB miss has occurred, there is the above described alias problem. Therefore, when a miss has occurred in the TLB real page memory, the TLB real page CAM 25 is used.

The outputs of the TLB real page memory 22, the multiplexer 23*a* and the cache state memory 24 are inputted to 4-input 1-output multiplexers (4:1 MUX) 22*b*, 23*b* and 24*b*, respectively. The way number (WN) from the TLB effective page memory 21 is inputted to each of the multiplexers 22*b*, 23*b* and 24*b* as the selectors. Each of the multiplexers 22*b*, 23*b* and 24*b* selects the data selected based on the way number (WN) and outputs the data.

It should be noted that, in the present embodiment, although the CPU 11 is configured to retrieve the data of a data width of 32 bits, the CPU 11 can retrieve an arbitrary data width equal to or smaller than the cache line size, depending on a specification of a processor core.

Next, operations of the above described cache memory 12 will be described. In the description below, a memory access request from the processor and a snoop response to the memory access request are described, and these are equivalent to a coherency control protocol used in commercially-available processors for multiprocessor, e.g., IBM PowerPC 970FX RISC Microprocessor. As for the IBM PowerPC 970FX RISC Microprocessor, see "IBM Power PC 970FX RISC Microprocessor User's Manual Version 1.7" as a reference (available from the URL below, as of Sep. 30, 2009 https://www01.ibm.com/chips/techlib/techlib.nsf/products/ PowerPC_970 MP_Micro processor).

(Memory Read Operation)

Figure 3:
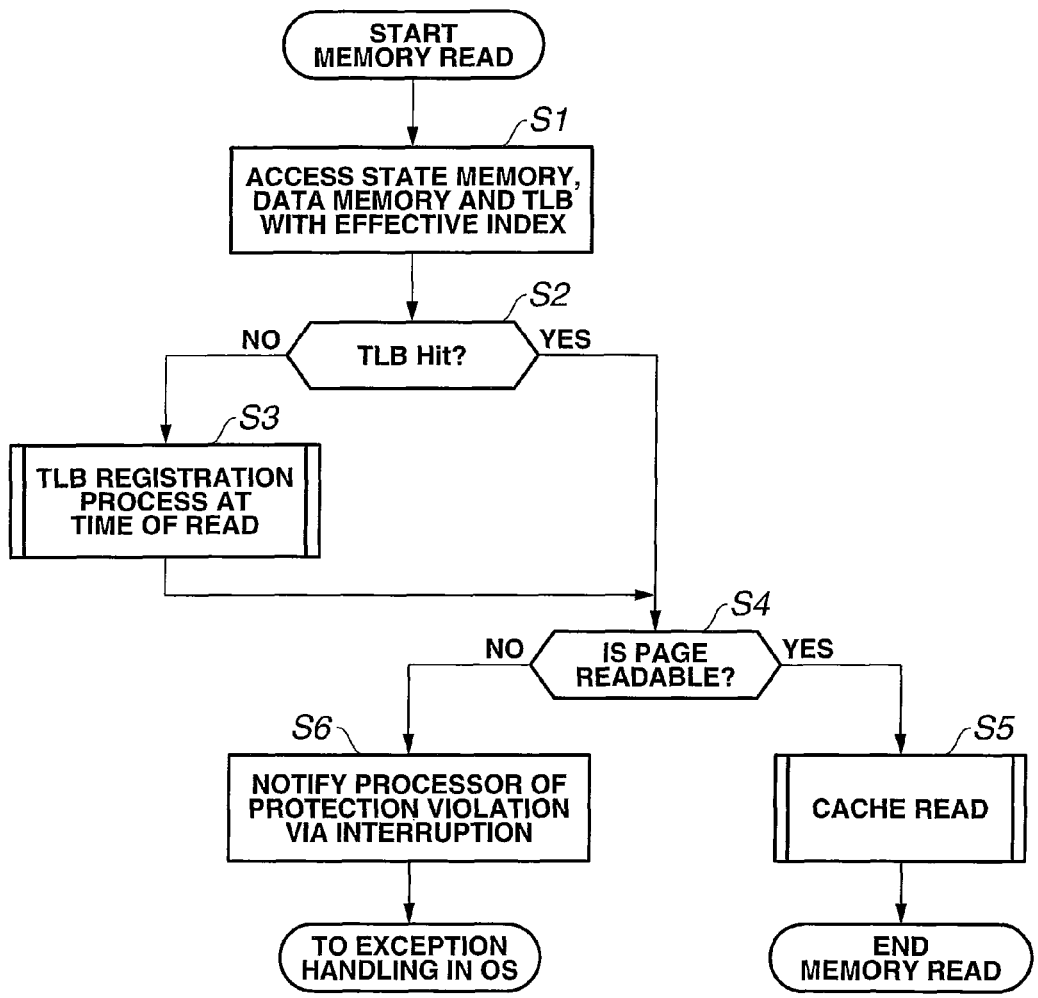
FIG. 3 is a flowchart for explaining a process flow at a time of memory read according to the first embodiment of the present invention.
Figure 4:
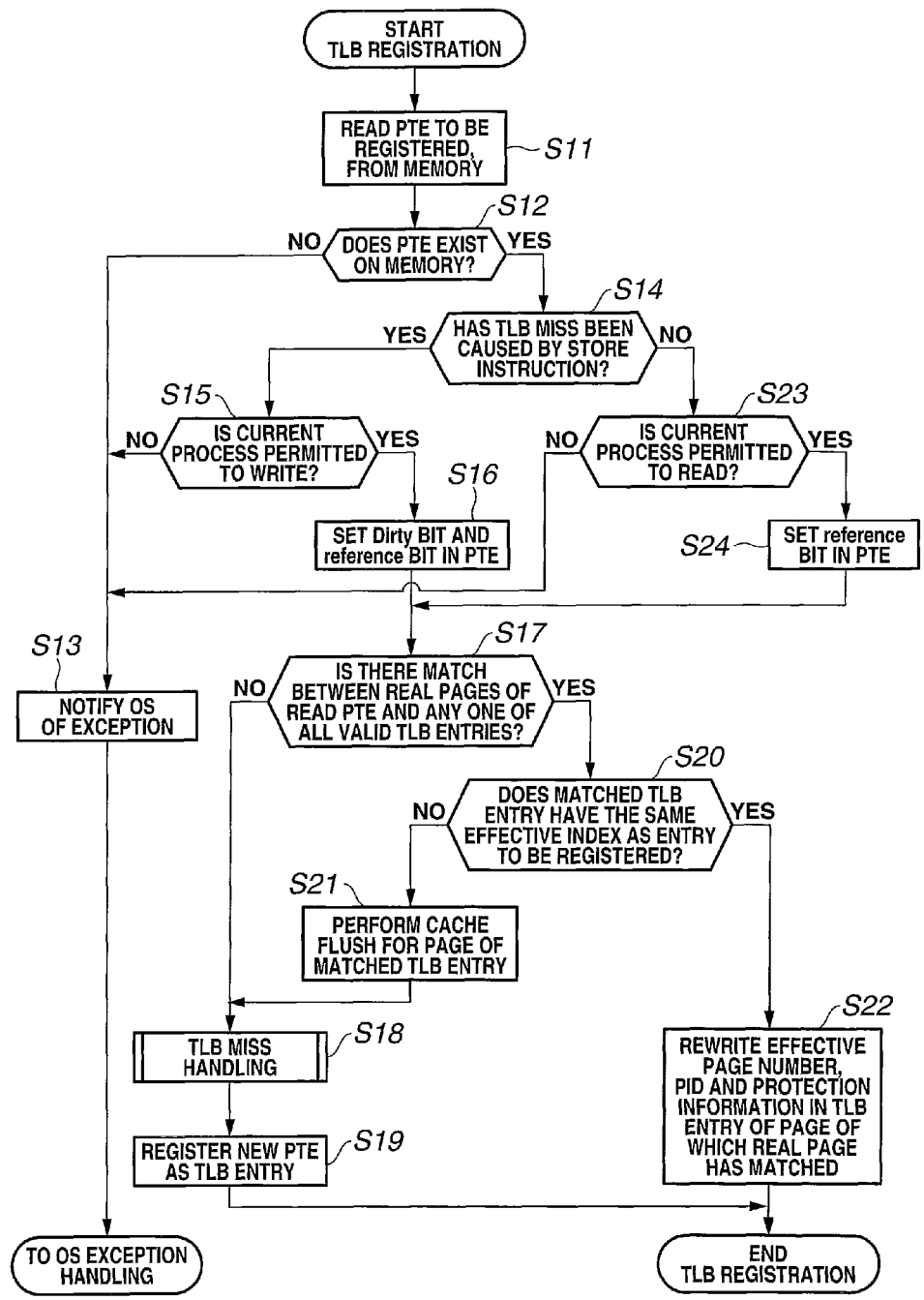
FIG. 4 is a flowchart for explaining a flow of a TLB registration process according to the first embodiment of the present invention.
Figure 5:
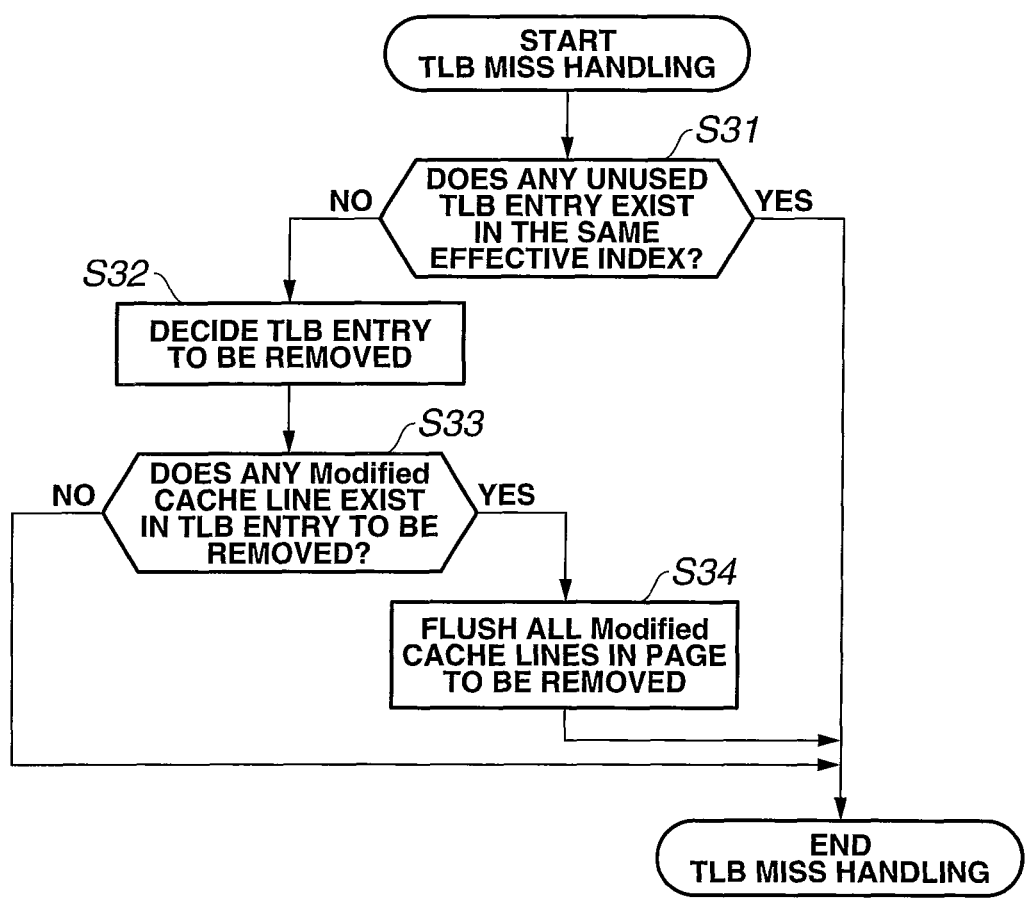
FIG. 5 is a flowchart for explaining a flow of TLB miss handling according to the first embodiment of the present invention.
Figure 6:
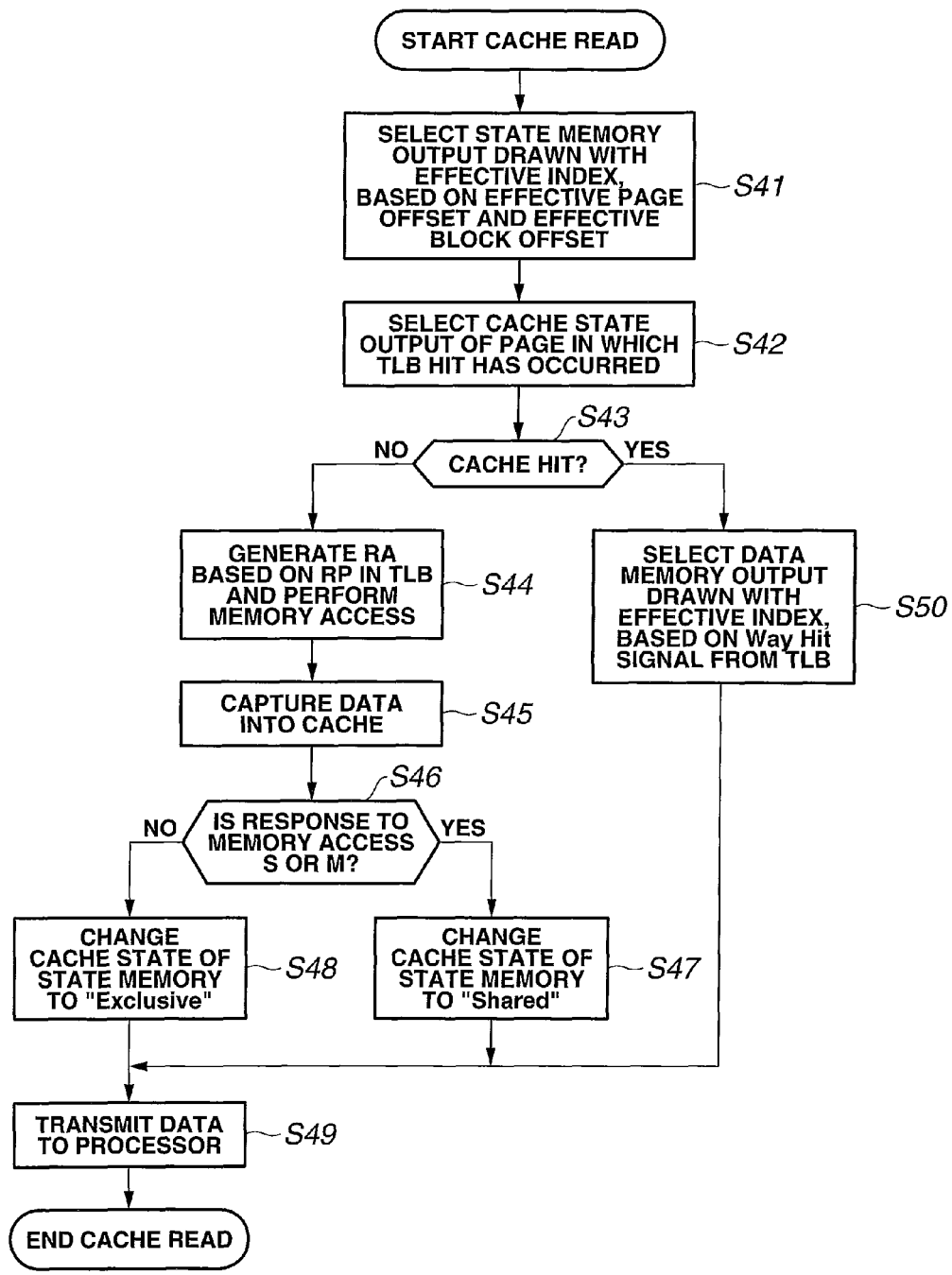
FIG. 6 is a flowchart for explaining a process flow at a time of cache read according to the first embodiment of the present invention.

FIG. 3 is a flowchart for explaining a process flow at a time of memory read. FIG. 4 is a flowchart for explaining a flow of a TLB registration process. FIG. 5 is a flowchart for explaining a flow of TLB miss handling FIG. 6 is a flowchart for explaining a process flow at a time of cache read.

Before the operations in the configuration of FIG. 2 are described, an overall process in the processor system 1 will be described by using FIGS. 3 to 6.

As shown in FIG. 3, if the memory read is started, the state memory 24, the data memory 23 and the TLB effective page memory 21 are accessed with an effective index (step S1). When the hit has not occurred in the TLB effective page memory 21, determination of the TLB hit (step S2) is NO, and the TLB registration process at the time of the read is executed (step S3). When the hit has occurred in the TLB, the determination of the TLB hit (step S2) is YES, and it is determined whether or not the effective page is readable (step S4). If the effective page is readable, the determination is YES in step S4, and the cache read is performed (step S5). If the effective page is not readable, the determination is NO in step S4. The CPU 11 is notified of protection violation by interrupt processing (step S6), and exception handling is executed by the OS.

As shown in FIG. 4, if the TLB registration process is started, a PTE (page table entry) to be registered is read from the DRAM 13 (step S11). It is determined whether or not the read PTE (page table entry) exists in the DRAM 13 (step S12). If the read PTE does not exist, the determination is NO in step S12, and the OS is notified of occurrence of an exception (step S13).

If the read PTE (page table entry) exists in the DRAM 13, the determination is YES in step S12, and it is determined whether or not the TLB miss has been caused by a store instruction (step S14).

Moreover, if the TLB miss has not been caused by the store instruction, the determination is NO in step S14, and it is determined whether or not the current process is permitted to read (step S23). If the current process is not permitted to read, the determination is NO in step S23, and the process proceeds to step S13. If the current process is permitted to read, the determination is YES in step S23, the reference bit is set in the PTE (page table entry) (step S24), and the process proceeds to step S17.

As shown in FIG. 5, if the TLB miss handling is started, it is determined whether or not any unused TLB entry exists in the same effective index (step S31). If the unused TLB entry exists, the determination is YES in step S31, and the process is terminated.

If no unused TLB entry exists, the determination is NO in step S31, the TLB entry to be removed is decided on (step S32), and it is determined whether or not any Modified cache line exists in the TLB entry to be removed (step S33). If no Modified cache line exists, the determination is NO in step S33, and the process is terminated.

If the Modified cache line exists, the determination is YES in step S33, all the Modified cache lines in the page to be removed are flushed (step S34), and the process is terminated.

As shown in FIG. 6, if the process of the cache read is started, the output of the state memory 24 drawn with the effective index is selected based on the offset and the block offset of the effective page (step S41), and the output of the cache state of the page in which the TLB hit has occurred is selected (step S42).

It is determined whether or not the cache hit has occurred (step S43). If the cache hit has not occurred, the real address is generated based on the real page number in the TLB, and the memory access request is issued (step S44). This memory access request is similar to the requests processed in a Read transaction by Power PC 970FX, or BusRd transaction. See the above-described "IBM PowerPC 970FX RISC Microprocessor User's Manual Version 1.7", the section of Read transaction by PowerPC 970FX, and above described "Parallel Computer Architecture—A Hardware/Software Approach—" BusRd transaction in Figure 6.5.

Then, obtained data is captured into the cache memory (step S45).

The memory access request is snooped by the memory and other processors. A processor which has snooped the memory access request checks the cache status managed by the processor itself. If the cache status is "Modified", the processor returns "Modified" response as the snoop response. If the cache status is "Exclusive" or "Shared", the processor returns "Shared" response as the snoop response. Therefore, the processor which has outputted the request updates the status of the cache state memory 24 depending on the snoop response. That is, if the snoop response is "Shared" response or "Modified" response (step S46), the processor changes the status of the requested cache line in the cache state memory 24 to "Shared" (step S47). Otherwise (if the snoop response is neither "Shared" response nor "Modified" response), the processor changes the status of the requested cache line to "Exclusive" (step S48).

Then, the data is transmitted to the CPU 11 (step S49).

If the cache hit has occurred, the determination is YES in step S43, the output of the data memory drawn with the effective index is selected based on the way number (WN) from the TLB (step S50), and the process proceeds to step S49. If the cache hit has occurred, the memory access request is not issued, and also the cache status is not updated.

(Memory Write Operation)

Figure 7:
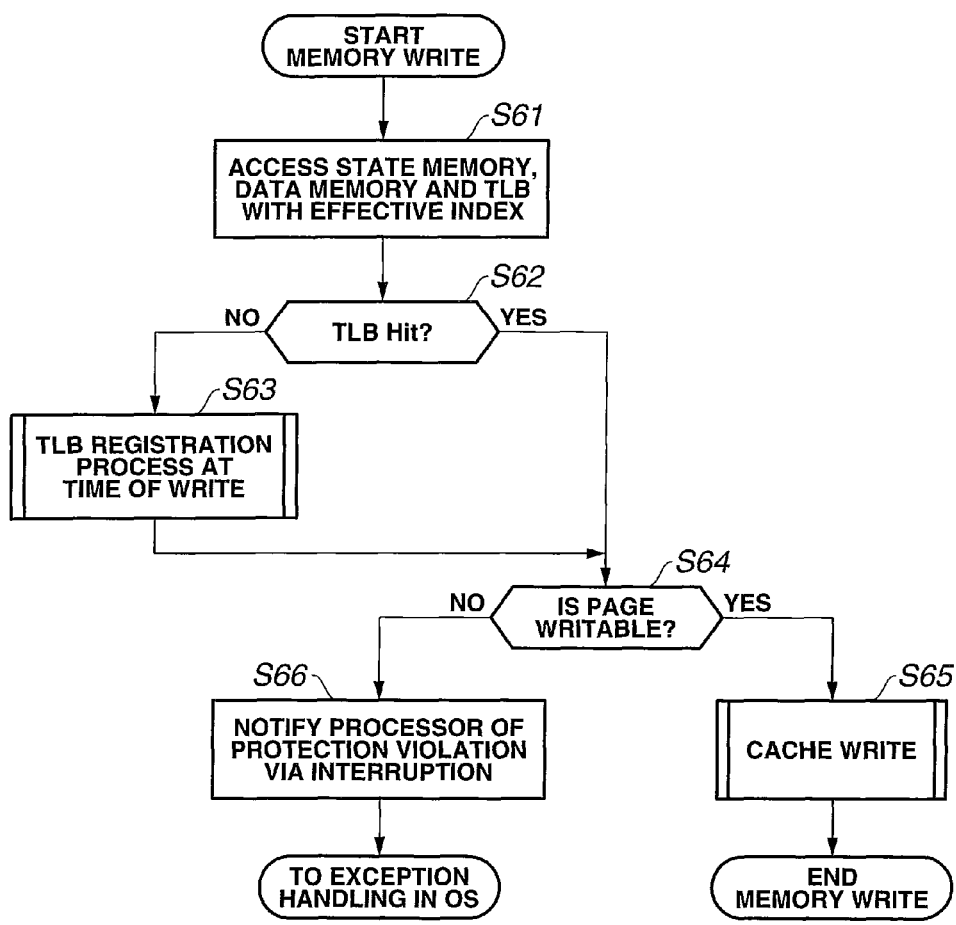
FIG. 7 is a flowchart for explaining a process flow at the time of memory write according to the first embodiment of the present invention.
Figure 8:
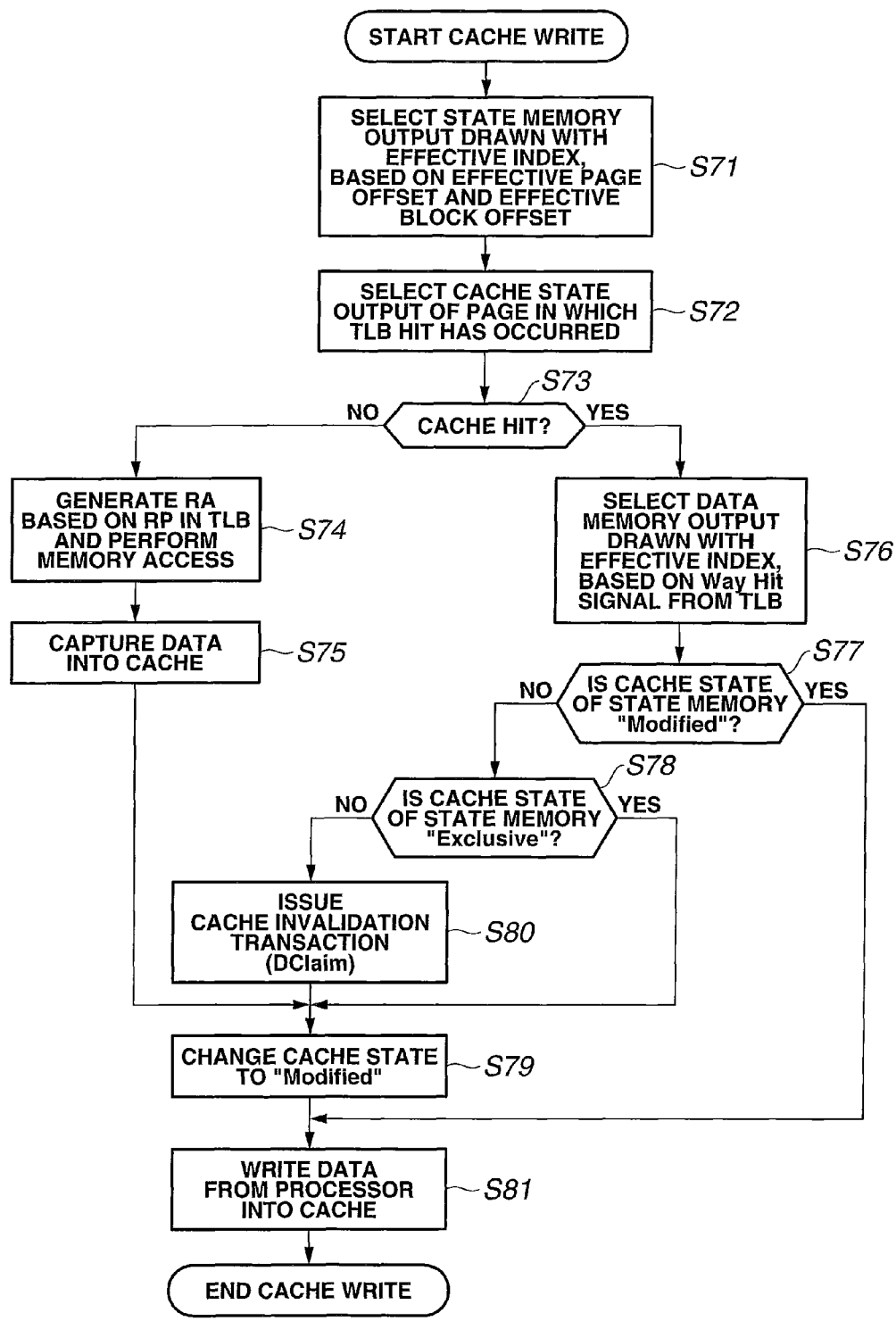
FIG. 8 is a flowchart for explaining a process flow at the time of cache write according to the first embodiment of the present invention.

FIG. 7 is a flowchart for explaining a process flow at the time of memory write. FIG. 8 is a flowchart for explaining a process flow at the time of cache write.

As shown in FIG. 7, when the memory write is started, the state memory 24, the data memory 23 and the TLB effective page memory 21 are accessed with the effective index (step S61). When the hit has not occurred in the TLB effective page memory 21, determination of the TLB hit (step S62) is NO, and the TLB registration process at the time of the write is executed (step S63). When the hit has occurred in the TLB, the determination of the TLB hit (step S62) is YES, and it is determined whether or not the effective page is writable (step S64). If the effective page is writable, the determination is YES in step S64, and the cache write is performed (step S65). If the effective page is not writable, the determination is NO in step S64. The CPU 11 is notified of protection violation by interrupt processing (step S66), and exception handling is executed by the OS.

As shown in FIG. 4, when the TLB registration process is started, the PTE (page table entry) to be registered is read from the DRAM 13 (step S11). It is determined whether or not the read PTE (page table entry) exists in the DRAM 13 (step S12). If the read PTE does not exist, the determination is NO in step S12, and the OS is notified of occurrence of an exception (step S13). If the read PTE (page table entry) exists in the DRAM 13, the determination is YES in step S12, and it is determined whether or not the TLB miss has been caused by the store instruction (step S14). If the TLB miss has been caused by the store instruction, the determination is YES in step S14, and it is determined whether or not the current process is permitted to write (step S15). If the process is not permitted to write, the determination is NO in step S15, and the process proceeds to step S13. If the process is permitted to write, the determination is YES in step S15, and a dirty bit and a reference bit are set in the PTE (step S16).

Then, it is determined whether or not there has been a match between the real page numbers of the read PTE (page table entry) and any one of all valid TLB entries (step S17). If there is no match between the real page numbers in step S17, the determination is NO, the TLB miss handling is executed (step S18), and a new PTE (page table entry) is registered as the TLB entry (step S19).

Moreover, if there has been the match between the real page numbers in step S17, the determination is YES, and it is determined whether or not the matched TLB entry has the same effective index as the entry to be registered (step S20). If the effective index is not the same as that of the entry to be registered, the determination is NO in step S20, the cache flush for the page of the matched TLB entry is performed (step S21), and the process proceeds to step S18.

If the effective index is the same as that of the entry to be registered, the determination is YES in step S20, and the effective page number, the process number (PID) and protection information in the TLB entry whose real page number has matched are rewritten (step S22).

It should be noted that the TLB miss handling is similarly performed in the operation at the time of the above-described memory read.

As shown in FIG. 8, when the process of cache write is started, the output of the state memory 24 drawn with the effective index is selected based on the offset and the block offset of the effective page (step S71), and the output of the cache state of the page in which the TLB hit has occurred is selected (step S72).

It is determined whether or not the cache hit has occurred (step S73). If the cache hit has not occurred, a real address is generated based on the real page number in the TLB, and the above-described memory access request is issued (step S74). In this case, the memory access request to be outputted is "memory read request to invalidate other cache lines", e.g., RWITM and BUSRdx. The memory access request is snooped by the memory and other processors. The processor which has snooped the memory access request checks the cache status managed by the processor itself. If the cache status is "Modified", the processor outputs "Modified" response as the snoop response, changes the cache status to "Invalid", and outputs data of the requested cache line to the request source processor. At this time, the memory cancels the read access to the requested cache line and data output to the request source processor. If the cache status is "Exclusive" or "Shared", the processor returns "Shared" response and changes the cache status to "Invalid". The memory outputs the data of the requested cache line to the request source processor. Then, the obtained data is captured into the cache memory (step S75), and the data received from the CPU 11 is overwritten on the cache (step S75). The processor which has outputted the request updates the status of the cache state memory 24 depending on the snoop response. Moreover, the processor which has outputted the memory read request (RWTIM or BusRdX) changes the status of the requested cache line in the cache state memory 24 to "Modified".

If the cache hit has occurred, the determination is YES in step S73, the output of the data memory drawn with the effective index is selected based on the way number (WN) from the TLB (step S76), and the process proceeds to step S77. If the cache status is "Modified", the cache status is not changed. If the cache status is "Exclusive" (step S78), the cache status is changed to "Modified" (step S79). If the cache status is "Shared", the processor issues cache line invalidation transaction (DClaim) (step S80), invalidates the caches of other processors, and upon receiving the snoop response, changes the cache status to "Modified". When the cache status becomes "Modified", the data from the processor is written into the cache (step S81). This cache line invalidation transaction is similar to the requests processed in DClaim transaction by PowerPC 970FX, or BusRdX. See the above described reference, "IBM PowerPC 970FX RISC Microprocessor User's Manual Version 1.7", DClaim transaction by PowerPC 970FX, and the above described "Parallel Computer Architecture—A Hardware/Software Approach—" BusRdX transaction.

Contents of the process in the processor system 1 have been described as above. Next, operations in cases of the TLB hit and a TLB miss will be described based on FIG. 2.

(In Case of TLB Hit)

First, as described above, the effective address 31 and the process number (PID) are inputted from the CPU 11 to the cache memory 12. In the TLB effective page memory 21, the effective page index (EP_Index) (15:12) in the inputted effective address 31 is used to select data in each way. Then, among the selected data, if the process number (PID) which is the identifier of the process related to the inputted effective address 31, and the high-order bits (31:12) as the effective page tag (EA_Tag) in the inputted effective address 31, match the process number (PID) and the effective page (EP) in the TLB effective page memory 21, respectively, the TLB effective page memory 21 outputs the matched way number (WN) as the hit signal, from the comparators 21*a*. In the comparators 21*a*, four outputs from the respective TLB effective page memories are compared with the high-order bits (31:12) and the process number (PID) of the effective address 31. It should be noted that if there is no match, the non-hit signal indicating a mismatch is outputted.

Here, the effective page (EP) in the TLB effective page memory 21 includes the effective page index (EP_Index) for use as an effective tag.

In the TLB real page memory 22, the effective page index (EP_Index) (15:12) in the inputted effective address 31 is used to select the data, that is, a page number of the real address, in each way. As will be described later, since real page information retained in the TLB real page memory 22 is not used except when the cache miss occurs or when another cache is invalidated, an implementation may be employed in which the access to the TLB real page memory 22 is started after the information in the TLB real page memory 22 is required.

In the data memory 23, the 9 bits (15:7) and the block offset (bits (6:2)) in the above described effective address 31 are used to select the data, that is, the data in the cache block, in each way. In other words, the multiplexer 23*a* uses the block offset (6:2) in the inputted effective address 31 to select one piece of data (32 bits) in one block, that is, one line (128 bytes). Hence, from the data memory 23, four pieces of the cache block data are outputted from four ways, and four pieces of the data (of 32 bits, respectively) corresponding to the four ways are outputted from the multiplexers 23*a*.

Moreover, in the cache state memory 24, the 9 bits (15:7) in the above described effective address 31 are used to select and output status data of the cache block (data of the cache state) in each way.

Hence, when there is a memory read access to the DRAM 13 from the CPU 11 as the processor core, the operations are performed as follows.

First, the TLB effective page memory 21 is accessed with the effective page index (EP_Index) (15:12) in the effective address 31 as the TLB index. In other words, in the TLB effective page memory 21, an entry in which the effective address (31:16) and the process number (PID) match the process number (PID) from the CPU 11 and the effective page index (EP_Index) (15:12) in the effective address 31 is searched by using the bits (15:12) in the effective address 31 as the TLB index.

The TLB effective page memory 21 outputs whether or not there is the way in which the matched entry exists, and if there is the way, outputs the way number (WN) of the way. In a case of no matched entry, the case is handled as the TLB miss.

Hereinafter, a case where the matched entry exists will be described, and the case of the TLB miss will be described later.

On the other hand, the data memory 23 which is the L1 cache is accessed with the bits (15:7) in the effective address 31 as the cache index. Then, the block offset (6:2) is inputted to the multiplexers 23*a*.

As described above, the data from each way of the data memory 23 is outputted. In the configuration of the present embodiment, since the data of the 32-bit width is passed to the CPU 11, one piece of the 32-bit width data is selected from the output of each way by using the block offset (6:2) in the effective address 31, by the multiplexers 23*a*.

Then, only the data in the hit way is selected by using the way number (WN) outputted from the TLB effective page memory 21, and is outputted by the multiplexer 23*b* which is the selector.

Then, in the CPU 11, the 32-bit data in the outputted 128 bytes is read.

Moreover, simultaneously with the output of the data from the data memory 23, the data of the cache state is outputted from each way of the state memory 24.

Then, the state memory 24 also uses the way number (WN) outputted from the TLB effective page memory 21, and selects only the data in the hit way by the multiplexer 24*b* which is the selector, and outputs the data (step S42 of FIG. 6).

If the status (cache state) outputted from the state memory 24 is other than invalid, the data outputted from the data memory 23 as the L1 cache can be used (step S47 of FIG. 6), and thus the data is outputted to the CPU 11 (step S49 of FIG. 6). If the status (cache state) is invalid, a cache miss handling operation to be described later is performed (step S44 of FIG. 6).

As described above, if the hit occurs in both the TLB and the cache, the process can proceed by using only the effective address (EA). In other words, if the hit occurs in both the TLB and the cache, it is not necessary to use the TLB real page memory 22.

Next, the case of the cache miss will be described.

If the cache miss has occurred when the TLB hit has occurred, the following operation is added. A case where the cache miss occurs when the TLB hit occurs is a case where, although the TLB hit has occurred, the cache state is invalid, and thus the data in the cache needs to be read from the DRAM 13.

The TLB real page memory 22 is accessed with the effective page index (EP_Index) (15:12) in the effective address 31 as the index. Since the TLB real page memory 22 is also of a 4-way set associative type, the TLB real page memory 22 outputs four real page numbers (39:12).

The multiplexer 22*b* uses the way number (WN) from the TLB effective page memory 21 to select one of the outputted real page numbers.

The selected real page number (39:12) is connected with low-order bits (11:0) in the effective address 31 to which a read request has been issued by the CPU 11, and the real address RA (39:0) is generated. The read request is transmitted to the DRAM 13 via the bus connected to the CPU 11, by using the real address RA (step S46 of FIG. 6). When the data is obtained, the data is written to a corresponding area in the data memory 23.

(In Case of TLB Miss)

When the TLB miss occurs, the following operation is added.

The PTE (page table entry) including the corresponding effective page is loaded from the DRAM 13 which is the main memory (step S11 of FIG. 4). Then, the real page number is inputted to the TLB real page CAM 25, and it is checked whether or not the same real page number exists.

If the same real page number does not exist, the following registration process is performed (in and after step S17 of FIG. 4).

In other words, the effective page number is obtained from the above described read PTE (page table entry), and the data is registered in the TLB effective page memory 21, the TLB real page memory 22 and the TLB real page CAM 25 (step S18 of FIG. 4, and step S31 of FIG. 5).

If the same real page number exists (that is, if the alias exists), the following process is performed.

Since the same real page number exists in the TLB real page CAM 25, the TLB real page CAM 25 outputs the effective page index (EP_Index) and the way number (WN) for which the same real page number exists.

If the outputted effective page index (EP_Index) matches the effective page index (EP_Index) of the effective page number obtained from the PTE (page table entry), the following rewrite is performed for the matched entry (step S22 of FIG. 4).

First, in the TLB effective page memory 21, the process number (PID) and the effective page (EP) are rewritten, and the corresponding Reference (R) bit is set. Then, other necessary information is also changed.

Then, since there is the match between the real page numbers of the TLB real page memory 22 and the TLB real page CAM 25, the TLB real page memory 22 and the TLB real page CAM 25 are not rewritten.

Furthermore, since contents of the cache state memory 24 and the data memory 23 inherit contents of the cache, the cache state memory 24 and the data memory 23 are not rewritten.

If the outputted effective page index (EP_Index) does not match the effective page index (EP_Index) of the effective page number obtained from the PTE (page table entry), the following process is performed (step S21 of FIG. 4).

The entry corresponding to the effective page index (EP_Index) and the way number (WN) outputted from the TLB real page CAM 25, that is, one TLB entry which has caused the alias, is invalidated. An invalidation process includes the cache flush for the corresponding effective page.

Furthermore, the other TLB entry which has caused the alias is also invalidated. The invalidation process also includes the cache flush for the corresponding effective page.

After the invalidation of the above described two TLB entries is completed, a predetermined registration process is performed for the TLB entry obtained from the PTE (page table entry).

Specifically, the process number (PID) and the effective page (EP) are registered in the TLB effective page memory 21. Furthermore, the Dirty bit is written in the PTE (page table entry), and a corresponding Valid (V) bit and the corresponding Reference (R) bit are set.

Then, in the TLB real page CAM 25, the real page (RP) is written in the TLB entry obtained from the PTE (page table entry), and the Valid (V) bit is set. Furthermore, in the TLB real page memory 22, the real page (RP) is written in the TLB entry obtained from the PTE (page table entry).

Moreover, if the same real page number does not exist (that is, if no alias exists), the following process is performed (step S18 of FIG. 4, and step S32 of FIG. 5).

The TLB entry obtained from the PTE (page table entry) is invalidated. The invalidation process includes the cache flush for the corresponding effective page.

After the invalidation of the TLB entry is completed, the predetermined registration process is performed for the TLB entry obtained from the PTE (page table entry) (step S19 of FIG. 4).

Specifically, the process number (PID) and the effective page (EP) are registered in the TLB effective page memory 21. Furthermore, the Dirty bit is written in the PTE (page table entry), and the corresponding Valid (V) bit and the corresponding Reference (R) bit are set.

Then, in the TLB real page CAM 25, the real page (RP) is written in the TLB entry obtained from the PTE (page table entry), and the Valid (V) bit is set. Furthermore, in the TLB real page memory 22, the real page (RP) is written in the TLB entry obtained from the PTE (page table entry).

Next, cache snoop will be described. The cache snoop is performed as follows by a snooper which is a hardware circuit. The snooper monitors the data on the bus between the cache memory 12 and the DRAM 13.

The TLB real page CAM 25 and the state memory 24 used for the snoop are used for the TLB registration and also for the access from the CPU 11.

When a coherent transaction flows through the bus, the detected real address (39:12) is inputted to the TLB real page CAM 25, and it is checked whether or not the corresponding effective page (EP) has been registered in the TLB effective page memory 21.

If the corresponding effective page (EP) exists, the effective page index (EP_Index) and the way number (WN) in the TLB effective page memory 21 are obtained.

It should be noted that if the corresponding effective page (EP) does not exist in the TLB effective page memory 21, no data exists in the L1 cache, and thus, subsequently, nothing is performed by a snoop process.

If the corresponding effective page (EP) exists, the obtained effective page index (EP_Index) and the way number (WN) are inputted to the cache state memory 24, and the cache state is checked.

A predetermined process is executed depending on the obtained cache state and a kind of the transaction.

It should be noted that, in the present embodiment, although the TLB real page CAM 25 and the TLB real page memory 22 are configured as separate memories, the TLB real page CAM 25 and the TLB real page memory 22 are not accessed except the following three cases, and thus may be configured to be physically included in the same memory. The three cases are the case of the cache miss (that is, only the TLB real page memory 22 is accessed), a time when the TLB miss occurs (the TLB real page CAM 25 is accessed, the alias is checked, and when a new TLB entry is registered, the new TLB entry is registered in the TLB real page CAM 25 and the TLB real page memory 22), and a time of the snoop (only the TLB real page CAM 25 is accessed).

It should be further noted that, according to the effective address cache memory of the present embodiment, even in a case of a memory space shared by the plurality of processes executed on different processors, the page of the effective address is unconstrained.

Furthermore, although the above described present embodiment is the set associative cache, of course, the above described present embodiment is also applicable to a direct mapped cache.

As above, according to the cache memory of the above described embodiment, the cache state memory and the data memory, each of which uses a portion of the high-order bits of the effective address (here, the effective page index and the page offset) as the index, have been provided. Therefore, the function of the TLB can be realized on the cache memory, and the alias problem can be solved, without using such a complicated circuit configuration as a conventional circuit configuration.

Second Embodiment

Next, a second embodiment of the present invention will be described.

Although a basic configuration of the effective address cache memory according to the second embodiment is the same as the above described first embodiment, the operation in a case where the alias has been detected is different.

In the first embodiment, if the alias has been detected, the invalidation process for the TLB entry which has caused the alias has been performed as shown in and after step S17 of FIG. 4.

In contrast, in the present embodiment, the process in step S21 is not performed. In other words, the new entry is registered without invalidating the TLB entry which has caused the alias. In the present embodiment, the alias occurs within the cache and the TLB of the same processor, and the alias is resolved by also applying cache coherence control with snooping, to the same processor. In other words, a plurality of addresses at which the alias has occurred exist within the L1 cache, and coherency of the statuses of a plurality of the cache lines is maintained by applying the coherence protocol to each cache line in which the alias has occurred.

For example, when a process B reads the real address written by a process A, an operation as follows is performed. A case where immediately after the process A has written the real address, the process B on the same processor attempts to read the real address will be considered. From a viewpoint of the effective address of the process A, the cache state is Modified. From a viewpoint of the effective address of the process B, the cache state is Invalid.

From a viewpoint of the process B, the address seems to be in the invalid status on the cache. Because of the cache miss, the process proceeds to step S44 of FIG. 6, and the DRAM which is the main memory is accessed.

The snoop is performed for the access to the DRAM. In other words, the TLB real page CAM 25 of FIG. 2 is accessed, and the hit occurs in the TLB entry managed by the process A. The cache line written by the process A is accessed, a Modified response is returned, and the data is outputted. The cache line managed by the process A is put into the Shared state. The CPU 11 receives the Modified response and the data outputted by the process A. The cache line managed by the process B which has issued a request is captured, and the cache state is put into Shared.

In the present embodiment, the process A and the process B which are executed on the same processor in a time-shared manner operate as if the process A and the process B were executed on separate processors.

It should be noted that, in a case of the configuration of the present embodiment, multiple hits are permitted in the TLB real page CAM 25. Specifically, a hit output of the TLB real page CAM 25 is assigned with 1 bit for each entry, and is not encoded. Moreover, in response to the permission of the multiple hits in the TLB real page CAM 25, the cache state memory 24 enables simultaneous accesses to all the entries. Specifically, the cache state memory 24 is composed of a normal logic circuit, instead of an SRAM. Then, the output from the cache state memory 24 is encoded by a priority encoder or the like, as in a case of a state of a coherent bus. For encoding the state, a method in which the cache state is encoded so that 1 bit is assigned for each state, a logical OR is obtained from all the entries which has caused the alias in the state memory 24, and the state of the state memory 24 is obtained, or the like may be used.

According to the effective address cache memory of the present embodiment, effects similar to the configuration of the first embodiment can be obtained, and also, the invalidation process for the TLB entry which has caused the alias can be omitted.

Third Embodiment

Next, a third embodiment of the present invention will be described.

A basic configuration of the effective address cache memory according to the third embodiment is the same as the above described second embodiment. However, in the third embodiment, even if an index which has caused the alias in the TLB effective page memory 21 matches an index to be registered, the TLB entry is not rewritten. In other words, each entry which has caused the alias in the TLB effective page memory 21 is under completely independent control, alias processing in the TLB is eliminated, and consistency among the entries which has caused the alias is left to a cache coherence mechanism.

In other words, the third embodiment is generally the same in the configuration as the second embodiment, and is different from the second embodiment in that the index of the TLB effective page memory 21 is not checked if the alias has been detected.

In a TLB entry registration process of the present embodiment, the processes in steps S17, S20, S21 and S22 of FIG. 4 are eliminated, and after the processes in steps S16 and S24, the processes in steps S18 and S19 are executed.

It should be noted that, in a case of the configuration of the present embodiment, constraints on a hardware configuration are the same as the second embodiment, the multiple hits in the TLB real page CAM 25 are admitted, and the cache state memory 24 can simultaneously access a plurality of the entries.

According to the present embodiment, the TLB entry is performed in a completely independent manner, and the plurality of processes executed on the same processor operate in exactly the same manner as the processes executed on the different processors.

Hence, the present embodiment has effects similar to the above described second embodiment. When the plurality of processes are executed, the TLB entry of each process is not invalidated, and thus an overhead of the TLB miss is reduced.

Fourth Embodiment

Next, a fourth embodiment of the present invention will be described.

The effective address cache memory according to the fourth embodiment is a full associative cache.

Figure 9:
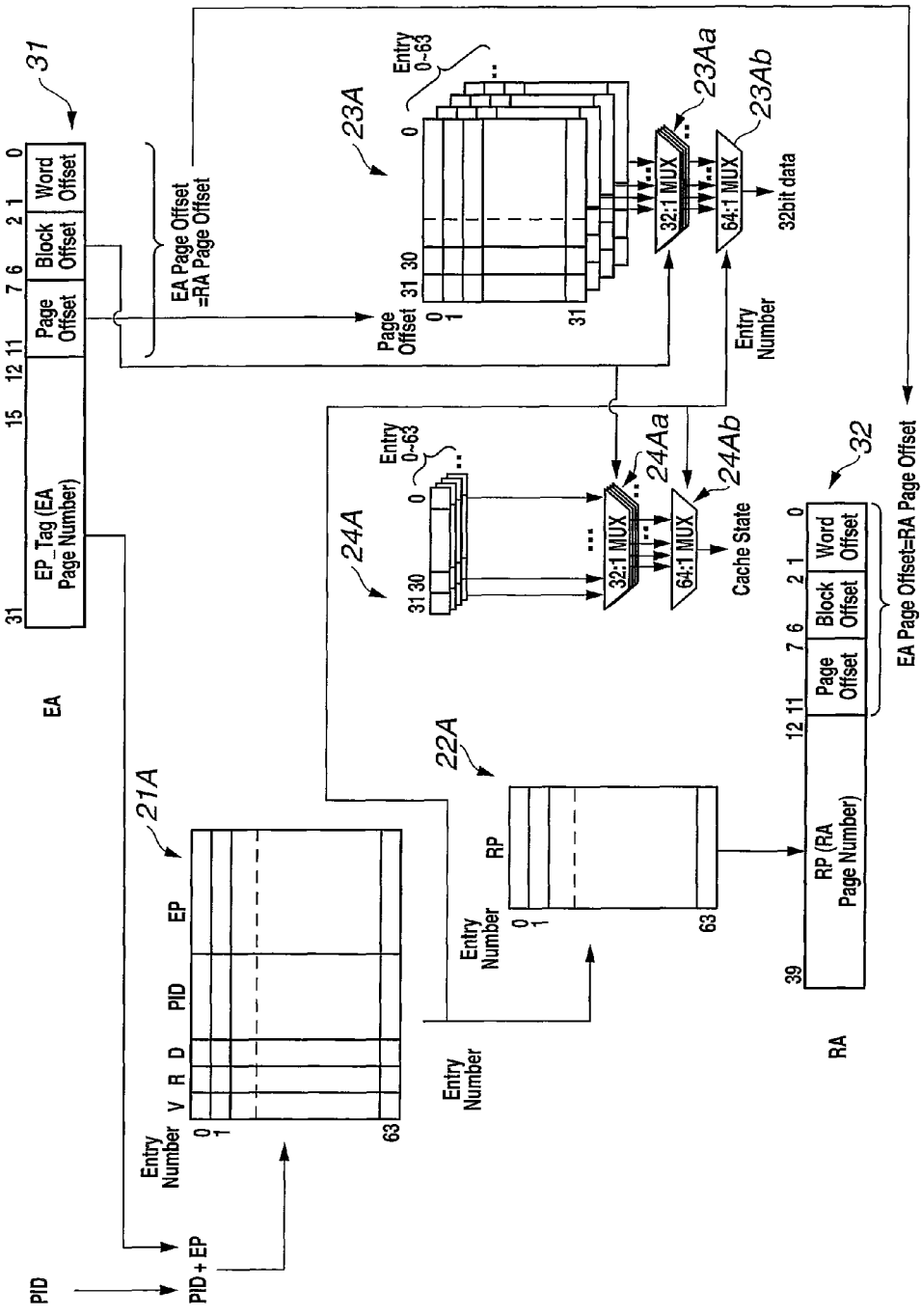
FIG. 9 is a structural diagram of the cache memory according to a fourth embodiment of the present invention.

FIG. 9 is a structural diagram of the cache memory according to the present embodiment.

As shown in FIG. 9, the cache memory is configured to include a TLBCAM 21A, a TLB real page memory 22A, a data memory 23A, and a cache state memory 24A.

For example, the full associative cache having the cache capacity of 256 kB and the cache line size of 128 bytes is configured to be managed in units of 4 kB page size. It is assumed that 10 bits of page information managed in the TLB and also 10 bits of the status of the cache line are included.

Then, if it is assumed that the real address has 40 bits and the effective address has 32 bits, respectively, a size of the TLBCAM 21A of the present embodiment is as follows.

The real page number 40 bits−12 bits=28 bits,
the effective page number 32 bits−12 bits=20 bits, and
the number of entries is 256 KB/4 KB=64 entries.

Therefore, the TLB size = (the real page number + the effective page number + a status bit) * the number of entries

= (28 + 20 + 10) * 64

= 3712 bits.

In a size of the state memory of the L1 cache (corresponding to a conventional tag memory), since the cache replacement is limited to be performed in units of the pages, the number of entries is significantly decreased.

In other words, the number of entries=256 KB/4 KB=64 entries, (64 entries=address 6 bits), the number of Index bits=the number of entries per way=6 bits, the number of Tag bits = the real address space −

(the number of entries + the line size)

= 40 bits − (6 bits + 12 bits)

= 40 bits − 18 bits

= 22 bits.

In the above configuration, the real page information is required, and effective page information is not required. Therefore, the L1 Tag memory size = (the number of Tag bits) * a total number of entries +

(the number of status bits * the number of lines in the page * the total number of entries

= (22 bits * 64) + 10 bits * 64 * 32)

= 1408 + 20480 bits

= 21888 bits.

Hence, under a next condition:

a L1 size is 256 kB, full set associative (however, 4 kB for the management);

the number of TLB entries is 64 entries, full associative;

a minimum page size is 4 kB;

the effective address/real address size is 32 bits/40 bits; and a L1 line size is 128 Bytes, the TLBCAM 21A requires approximately 4000 bits, and the cache state memory 24A which is a L1 state memory requires approximately 22000 bits. Thus, only a memory of a total of approximately 26000 bits is required.

The L1 cache can be managed with the memory smaller than the conventional memory. The tag per capacity and a capacity of the TLB are reduced because the tag of the L1 cache has been associated with the page number and thus can be omitted.

Next, in order to consider a merit in terms of the performance, a situation where two processes (having effective address spaces which are independent of each other) operate on the same processor, and the two processes share the same real address page to pass the data will be considered. A case where the two processes are the process A and the process B, respectively, the shared real page is $RP\_1$, the effective pages of the process A and the process B corresponding to RP_1 are EP_1A and EP_1B, and the process B reads a page updated by the process A will be considered.

It is assumed that write permission for the page has been given to the process A, while the write permission for the page has not been given to the process B. It is assumed that a page table has been previously created, and the real page has not been used until the process A starts creating the data to be passed to the process B. Moreover, it is assumed that the process A is closed when the process A completes the creation of the data to be used by the process B, and the process B is invoked. Moreover, it is assumed that the cache has employed a write allocate, write back method.

Figure 10:
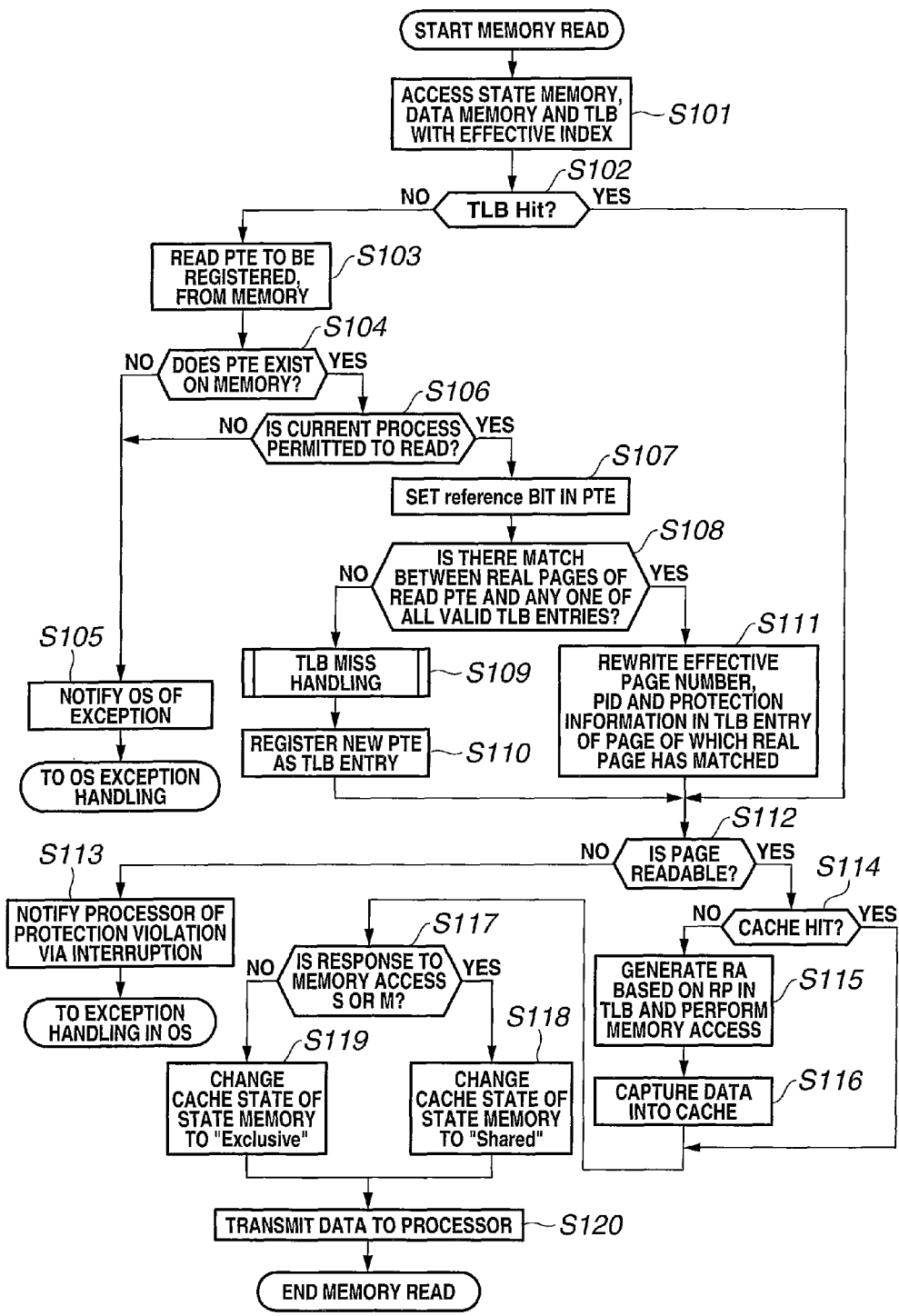
FIG. 10 is a flowchart at a time of shared memory read in the fourth embodiment of the present invention.
Figure 11:
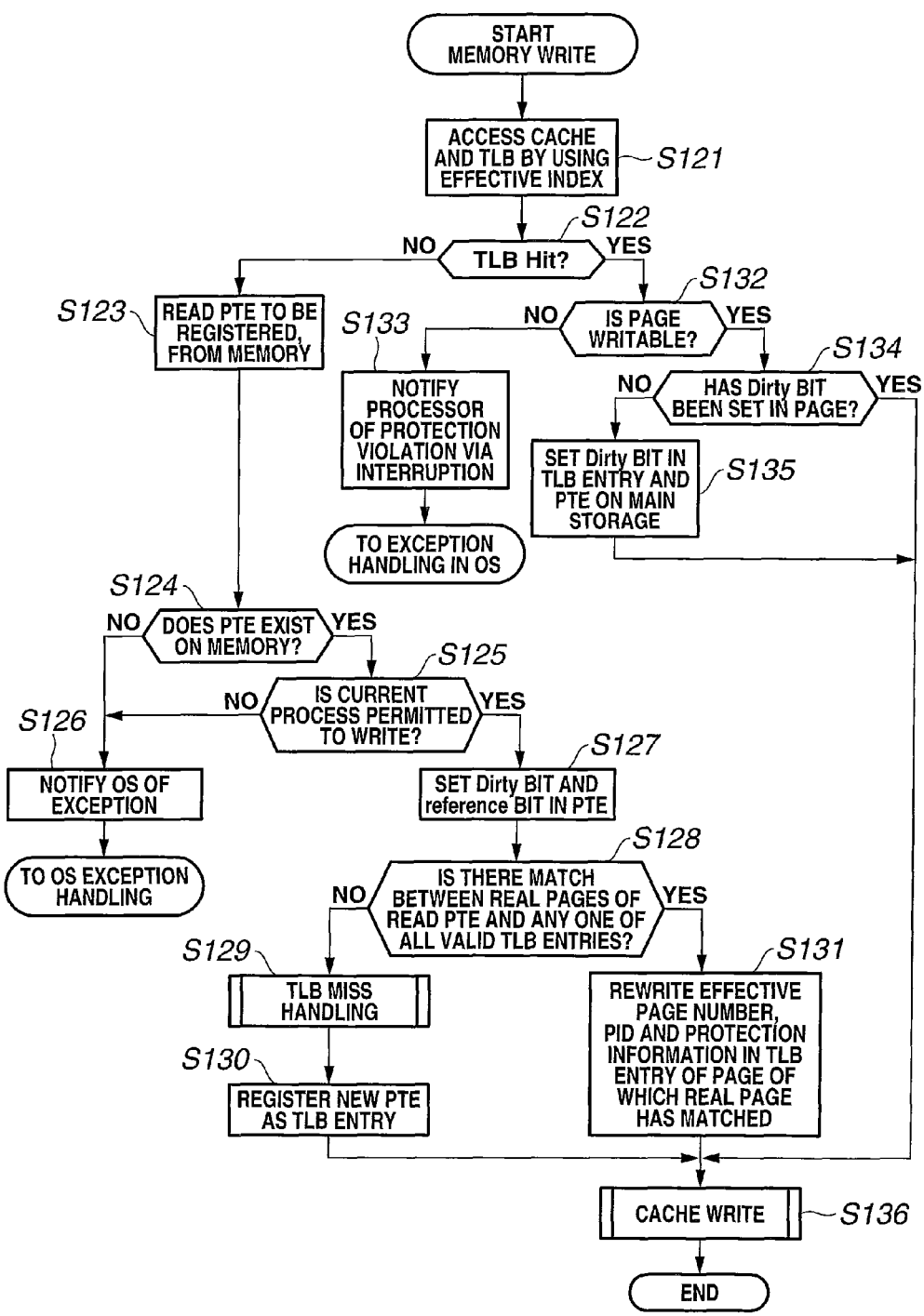
FIG. 11 is a flowchart at a time of shared memory write in the fourth embodiment of the present invention.

Hereinafter, shared memory read and shared memory write will be described by using FIGS. 10 and 11. FIG. 10 is a flowchart at a time of the shared memory read in the present embodiment. FIG. 11 is a flowchart at a time of the shared memory write in the present embodiment.

When the process A starts creating the data to be passed to the process B, the process A accesses the TLB with the effective index. However, since the TLB miss occurs in step S122 of FIG. 11, a page table entry which associates the real page RP_1 with the effective page EP_1A is invoked to the TLB (step S123). Then, the Valid bit is set in the TLB, and the status of each cache line within the page is invalid. For the process A, a write bit has been set in the page, and thus the process A can write to the page. Moreover, when the process is started, the page has not been written, and thus the page is clean. However, since the access is performed with memory write, the dirty bit is set in the page (step S135).

Because of the write allocate method, the cache line to be written is read from a main storage (step S44), and the TLB is rewritten so that the status of the cache line is valid, dirty. Subsequently, if the cache hit occurs in the write to the cache by the process A, the data on the cache is updated. If the cache miss occurs, data is allocated to the cache from the main storage, and the cache is updated. Because of the write allocate method, even if only a portion of the cache line is updated, the corresponding cache line remains in a most recent status.

A status where the write to the page by the process A has been completed and the process has been switched from the process A to the process B will be considered. It is assumed that the real address RP_1 has not been accessed, and also, has not been removed from the L1 cache, until the process B is launched. When the process B accesses the real address RP_1, although a miss occurs in the effective address since the process ID is different (step S102), the hit occurs in the real address (step S108). Consequently, the TLB performs operations required for switching the process, such as changing the effective page number from EP_1A to EP_1B, changing the process ID from the process A to the process B, and dropping the write bit for the process B, without rewriting the valid bit and the dirty bit of the page (step S111). Then, only the page information is rewritten, cache line information is not rewritten, and also, the cache flush is not performed.

A case where the process B designates the effective address space EP_1B and accesses the real address space RP_1 will be considered. As described above, although the process ID and the effective page information in the TLB have been rewritten, the page table on the TLB is retained, and contents of the L1 cache are also retained. Therefore, the process B can read information written by the process A, from the cache. In an area to which the process A has not written within the same page, since the status of the cache line is invalid, the cache miss occurs. However, correct data can be read by allocating the data from the memory to the cache.

As described above, the process B can read data shared with the process A from the cache without causing any unnecessary cache miss or TLB miss.

Figure 12:
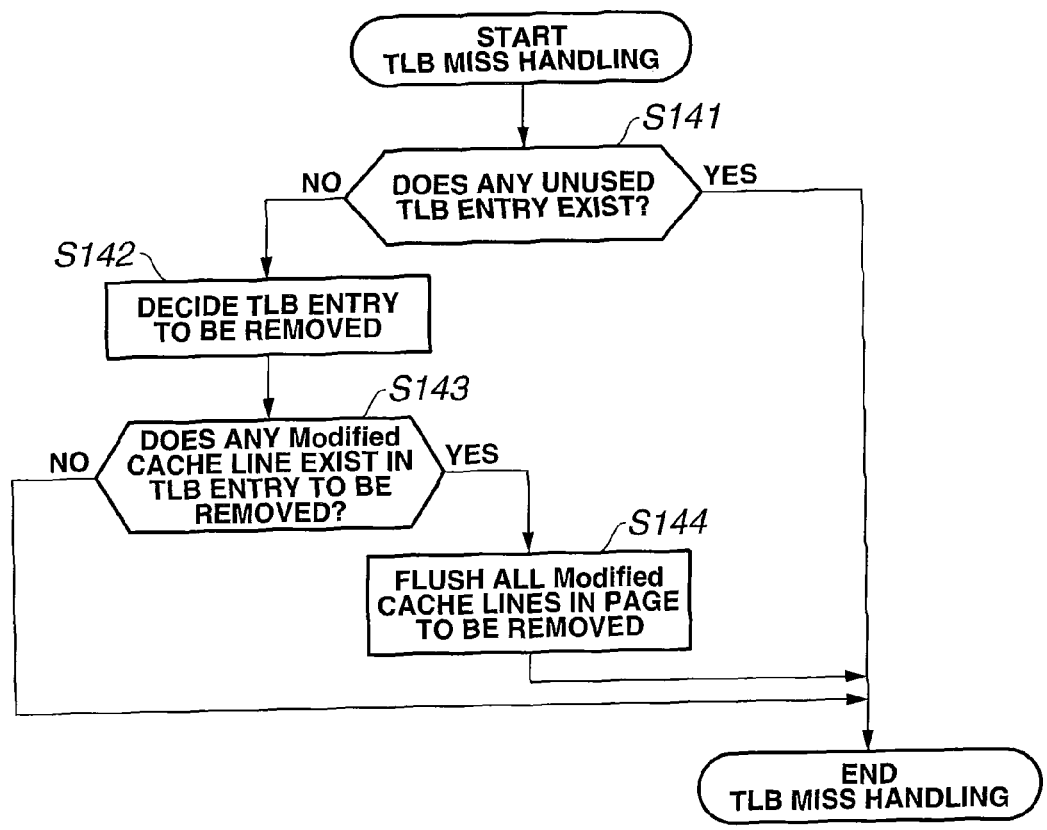
FIG. 12 is a flowchart at a time of the TLB miss handling according to the fourth embodiment of the present invention.
Figure 13:
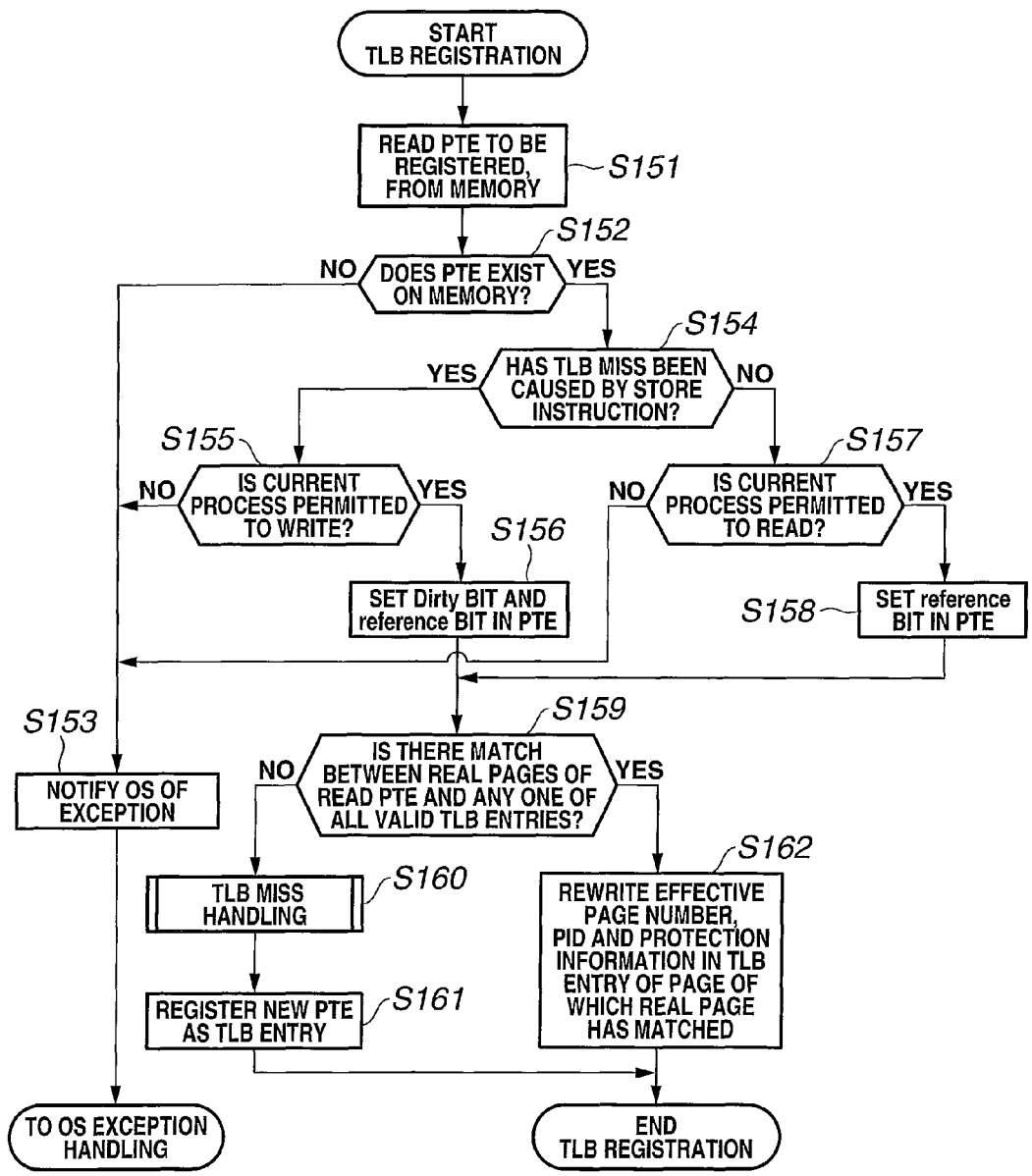
FIG. 13 is a flowchart at a time of the TLB registration process according to the fourth embodiment of the present invention.

If the TLB needs to be invalidated, such as if RP_1 has become a replacement target due to another TLB miss, it can be ensured that the system correctly operates, by performing the following operation. FIG. 12 is a flowchart at a time of the TLB miss handling in the present embodiment. FIG. 13 is a flowchart at a time of the TLB registration process in the present embodiment.

It can be seen from the TLB entry of the present embodiment whether or not the cache line is valid and whether or not the cache line has dirty data. The cache line is written back to the main storage, and the valid bit in the corresponding cache line is dropped.

Moreover, the cache flush is performed until no dirty cache line exists in the corresponding page. Moreover, when the cache flush within the page is completed, the page is invalidated.

The page table entry which is the replacement target is registered in the TLB.

In the present embodiment, if the TLB miss has occurred, a check of "whether or not any entry in which an RP Hit occurs exists on the TLB" has been added (steps S108 and S128), and if the entry exists, a process configured to partially rewrite the TLB entry (steps S111 and S131) has been added. Conventionally, if the TLB miss has occurred, very heavy processes for the TLB miss and the TLB registration have unconditionally occurred. Moreover, when the process B has started accessing a shared memory, heavy processes for the invalidation of the TLB entry of the process A and the cache flush within the page indicated by the entry have necessarily occurred for a shared memory space. In contrast, according to the present embodiment, a relatively light process configured to rewrite the TLB entry is highly likely to be invoked.

It should be noted that, in the present embodiment, the cache state can also be managed in units of the pages. If the cache state is managed in units of the pages, a configuration is employed in which the cache state memory 24A for each page offset is not included, and one set of the cache state memories 24A is included for the entire page. In other words, the page offset (0 to 31) is not decoded, and only one set of statuses of a coherency protocol, for example, the MESI, is included for the entire page. Also, if the cache state is managed in units of the pages, similarly to FIG. 9 (and FIG. 14 to be described later), the offset within the page such as the address (11:0) is given to the data memory, and the data memory is accessed. In other words, the implementation can be performed in exactly the same configuration except the cache state memory.

As above, according to the effective address cache memory of the present embodiment, the effects similar to the configuration of the first embodiment can also be obtained in a full associative method.

Fifth Embodiment

Next, a fifth embodiment of the present invention will be described.

The effective address cache memory according to the fifth embodiment is also the full associative cache.

Figure 14:
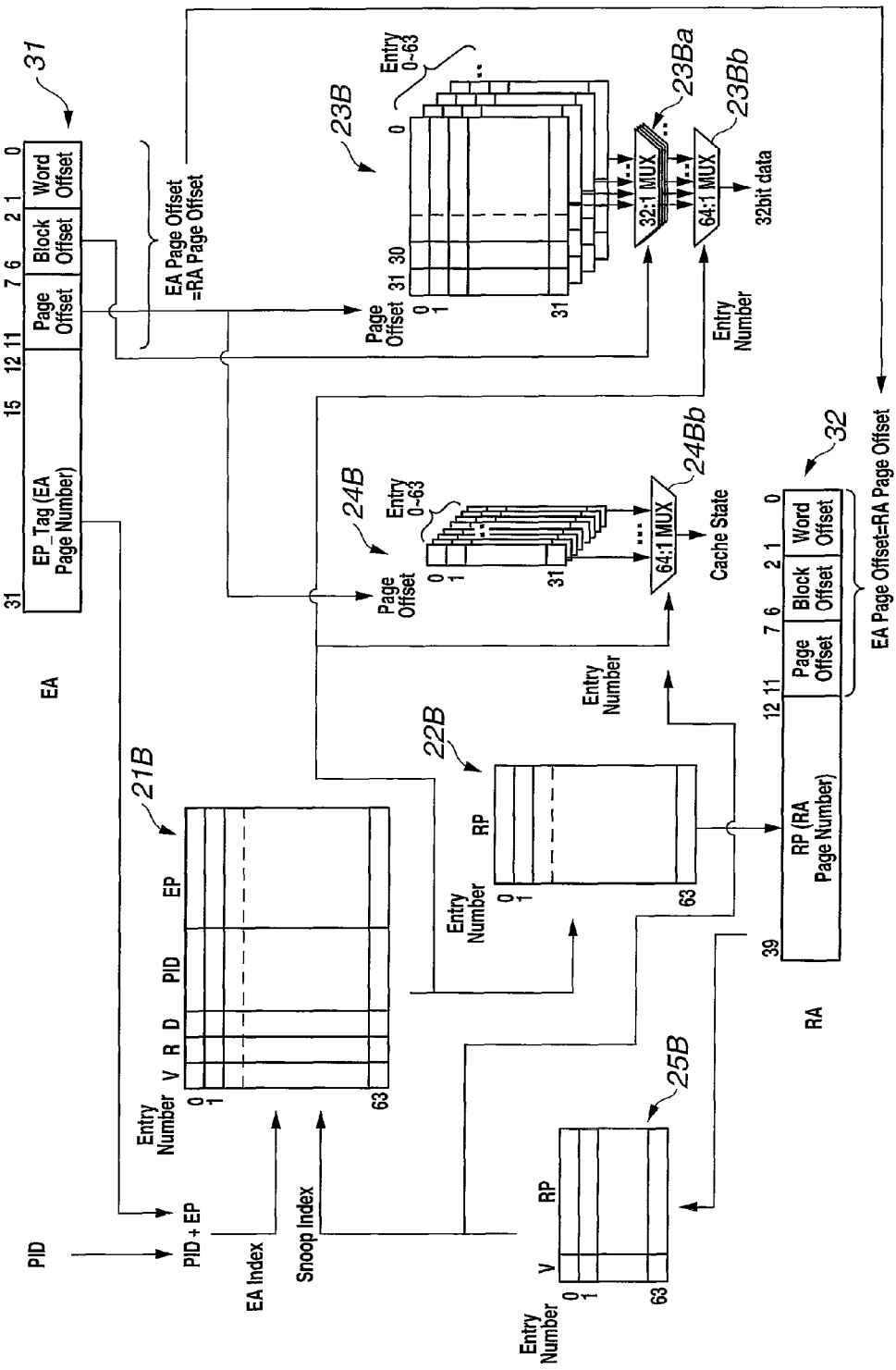
FIG. 14 is a structural diagram of the cache memory according to a fifth embodiment of the present invention.

FIG. 14 is a structural diagram of the cache memory according to the present embodiment.

As shown in FIG. 14, the cache memory is configured to include a TLBCAM 21B, a TLB real page memory 22B, a data memory 23B, a cache state memory 24B, and a TLB real page CAM 25B.

In the present embodiment, a configuration is employed in which the snoop can be performed by the TLB real page CAM 25B.

In the present embodiment, since the access with the effective address from a processor core side is almost similar to the fourth embodiment without any snoop mechanism, a description thereof is omitted. When there is the access with the real address from a processor bus, the cache status is checked by the following procedure.

The bits (39:12) corresponding to the page number of the real address of the processor bus are inputted to the TLB real page CAM 25B. If any matched real page exists in the TLB real page CAM 25B, the TLB real page CAM 25B outputs the entry number. If no matched real page exists, the snoop is terminated.

The cache state memory 24B is accessed with the entry number. Then, if the access conflicts with the access from the CPU 11, the snoop is prioritized.

The cache status is checked in the cache state memory 24B. A snoop response is decided on depending on a request which has been issued and the cache state, and the cache state is updated. If data transfer is required due to the cache state of Modified of the MESI or the like, the data transfer is performed.

In response to the request from the CPU 11, the cache in the present configuration outputs a snoop request as follows.

The cache state memory 24B is accessed with the bits (11:7) in the effective address 31 from the CPU 11, and the cache state is checked. Since the cache is the full associative cache, there are 64 candidates.

Simultaneously, the TLB effective page CAM 21B is accessed by using the page number of the bits (31:12) in the effective address 31 and the process number (PID), and it is checked whether or not the matched entry exists. If the matched entry exists, the entry number is outputted. If no matched entry exists, the process for the TLB miss is performed. Since the TLB miss has already been described, the description thereof is omitted.

In the case of the TLB hit, the entry number output of the TLB effective page CAM 21B is used to select the cache state from the cache state memory 24B. If the cache is M or E, the snoop is not required. Otherwise, the snoop request is issued if necessary, depending on the request from the CPU 11 which is the processor core, and the cache state.

Examples in which the snoop is required include the write to the state, or the cache miss under a TLB hit condition.

In a configuration supporting the snoop, the snoop checks whether or not an address which is a snoop target exists in the cache, by using the TLB real page CAM 25B. The TLB real page CAM 25B is also used for checking whether or not the corresponding entry exists in the TLB when the TLB miss occurs. However, since the TLB miss does not frequently occur, even if the TLB real page CAM 25B is also used for the snoop, an overhead is small. On the other hand, the cache state memory 24B is referred to for each data cache access, and thus is frequently accessed. However, since the snoop has previously excluded unnecessary transactions in the TLB real page CAM 25B, it is not necessary to check the cache status of the transactions which must not exist in the cache, and the overhead is small.

As above, according to the effective address cache memory of the present embodiment, the effects similar to the configuration of the first embodiment can also be obtained in the full associative method.

Sixth Embodiment

Next, a sixth embodiment of the present invention will be described.

The effective address cache memory according to the sixth embodiment is also the full associative cache.

Figure 15:
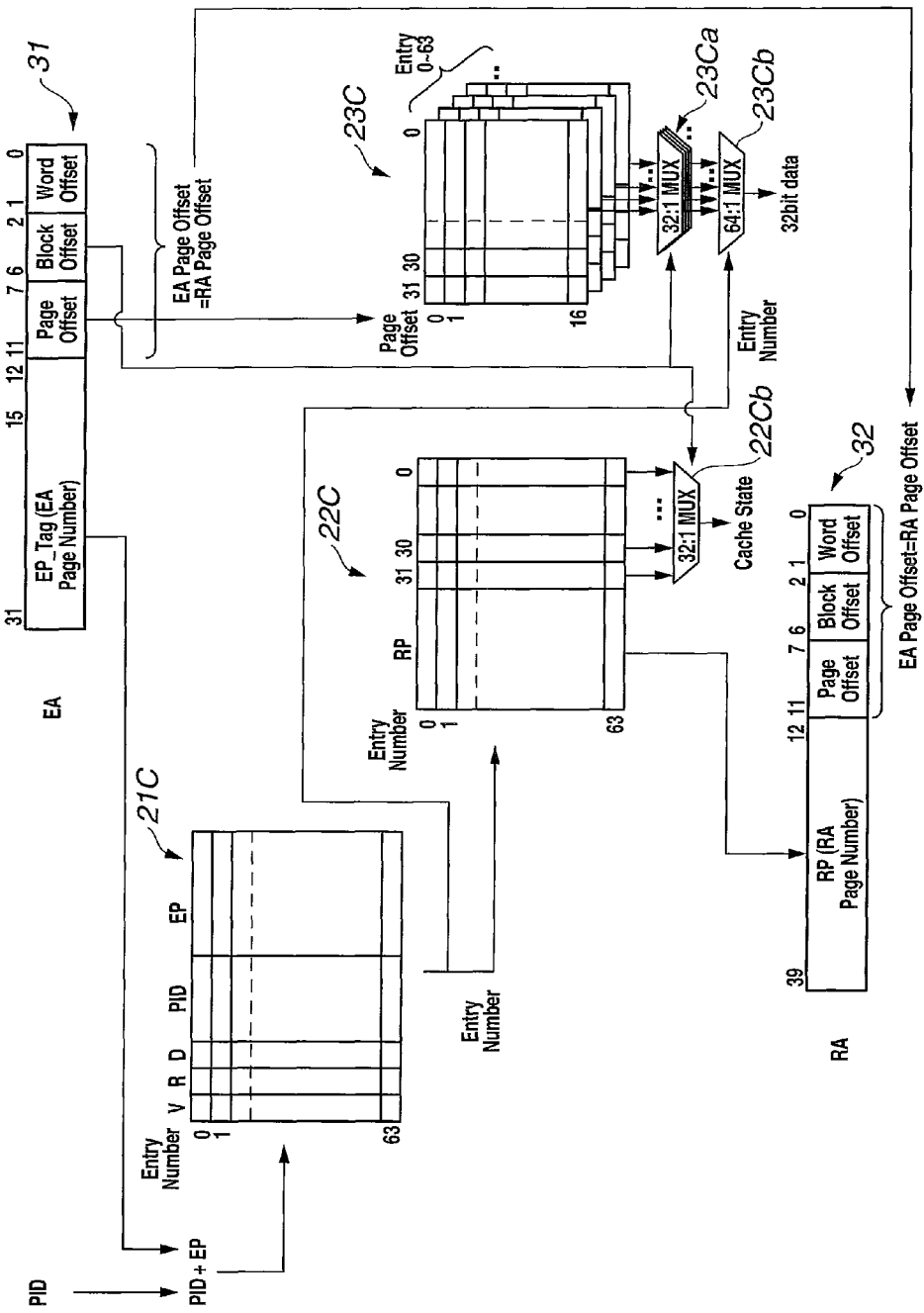
FIG. 15 is a structural diagram of the cache memory according to a sixth embodiment of the present invention.

FIG. 15 is a structural diagram of the cache memory according to the present embodiment.

As shown in FIG. 15, the cache memory is configured to include a TLBCAM 21C, a TLB real page memory 22C, and a data memory 23C.

In the present embodiment, the TLB real page memory 22C is configured to include information on the cache state for each entry.

As above, the effects similar to the configuration of the first embodiment can also be obtained in the effective address cache memory in the full associative method of the present embodiment.

Seventh Embodiment

Next, a seventh embodiment of the present invention will be described.

The cache memory of the present embodiment has a secondary TLB in addition to a primary TLB, as the TLB. Then, the secondary TLB is a memory which is not linked to the cache, or which has only the page table and has no translation mechanism.

The secondary TLB is 4-way associative, which is the same as the primary TLB, or more than 4-way associative, and includes the number of entries larger than the number of entries in the primary TLB, and the primary TLB. Then, "dirty" and "reference" are managed in the secondary TLB.

In a configuration of an effective cache memory, the cache is 4-way set associative, replacement management for the cache is performed in units of the pages, the cache state is managed in units of the cache lines, and measures against the alias are taken as follows.

For example, if the effective index has matched, the PID, the effective page number, the protection and the like in the TLB are rewritten. If the effective index does not match, the TLB entry which has caused the alias is not invalidated and left unchanged.

Moreover, although the alias has occurred between different indices, coherency control is performed in units of the cache lines, and a coherency mechanism of the processor bus is used for coherency between the entries. As a result, the coherency between the entries is maintained.

Eighth Embodiment

Next, an eighth embodiment of the present invention will be described.

The cache memory of the present embodiment is a memory provided with a mechanism configured to, when the TLB registration process is performed, read the page indicated by the registered TLB entry from the memory at a low priority.

During the access at the low priority, if the processor accesses the cache line in the corresponding page, the cache line is accessed at a high priority.

The above described cache memory of each embodiment can be implemented only by hardware, and can appear as a normal processor having the cache and the TLB, from a viewpoint of the software including the OS.

As above, according to the cache memory of each embodiment, in the processor having the effective storage mechanism and the cache memory, the cache is managed in units of the pages of the effective storage mechanism, and thereby the same part is used as both the TLB and the Tag memory of the cache. Therefore, a circuit amount can be reduced.

Furthermore, an alias check process in the effective cache can be reduced, and an overhead when the TLB miss occurs can also be reduced.

Particularly, in the processor having the TLB and the cache memory, since the tag of the cache is provided in units of the pages managed in the TLB, the tag memory only has to retain the cache status. Therefore, a capacity of the tag memory can be reduced.

Moreover, since the cache status is managed in units of the cache lines, only a necessary portion has to be initialized when the process is started. Therefore, the start is accelerated. If the cache flush is performed, such as if the TLB is invalidated, only the dirty cache line has to be flushed instead of the entire page. Therefore, an overhead of the TLB invalidation becomes small. Moreover, if a coherent cache is used and communication between the processors is performed with the shared memory, a coherent cache mechanism can be used, which provides good efficiency in terms of the implementation and the performance.

Moreover, since the page number of the effective address can be rewritten while the page number of the real address of the TLB is retained, or the page number of the real address of the TLB is rewritten while the cache status is maintained, if the communication between the processes is performed by using the shared memory on the same processor, it is not necessary to perform the cache flush and the TLB invalidation process with a large overhead, and the shared data is not removed from the cache. Therefore, performance of a watched process is improved, while bandwidths of the bus and the memory are not wasted also in the entire system.

Moreover, as described above, a coherent snooping cache mechanism can be used by including the tag memory configured to snoop in the processor bus.

As above, according to the above described each embodiment, it is possible to realize the effective address cache memory and an effective address caching method in which the function of the TLB can be realized on the cache memory and the reduction in the circuit amount can be attempted.

The present invention is not limited to the above described embodiments, and various modifications, alterations and the like can be made in a range not changing the gist of the present invention.

What is claimed is:

1. An effective address cache memory, comprising:
a TLB effective page memory configured to retain entry data including an effective page tag of predetermined high-order bits of an effective address of a process with a plurality of low-order bits including a least significant bit in the effective page tag as a first index, and output a hit signal when the effective page tag matches the effective page tag from a processor;
a data memory configured to retain cache data corresponding to the same effective page tag as the TLB effective page memory for the same entry as the first index using a second index including the first index and a page offset; and
a cache state memory configured to retain a cache state of the cache data stored in the data memory, in a manner corresponding to the second index.

2. The effective address cache memory according to claim 1, wherein the data memory replaces the cache data in units of effective pages in an operating system configured to manage execution of the process.

3. The effective address cache memory according to claim 1, wherein the cache state in the cache state memory is managed in units of cache blocks smaller than a page size.

4. The effective address cache memory according to claim 3, further comprising:
a mechanism configured to interchange data only in a corresponding block depending on a status of the cache state memory.

5. The effective address cache memory according to claim 1, further comprising:
a snoop mechanism configured to maintain coherency of the cache data in the data memory.

6. The effective address cache memory according to claim 1, wherein in addition to the effective address, an identification number such as a process identifier, other than the effective address, is also set as a comparison target.

7. The effective address cache memory according to claim 6, wherein
all or some of the effective address, other identifiers and the like are selectively set as comparison targets, and only a match of a designated portion is regarded as a hit.

8. The effective address cache memory according to claim 1, further comprising:
a mechanism configured to retain a real address corresponding to the cache data retained in the data memory, and examine whether or not data of the corresponding real address is retained in the data memory.

9. The effective address cache memory according to claim 8, wherein the same real address can be registered in a plurality of entries.

10. The effective address cache memory according to claim 8, wherein the same real address cannot be registered in a plurality of entries.

11. The effective address cache memory according to claim 8, wherein a full associative memory is used as means configured to retain the real address.

12. The effective address cache memory according to claim 11, wherein as the full associative memory, a full associative memory which can also be read with an index is used.

13. The effective address cache memory according to claim 1, wherein the TLB effective page memory retains the entire data memory.

14. The effective address cache memory according to claim 1, wherein the TLB effective page memory retains an address range which is larger than the entire data memory.

15. The effective address cache memory according to claim 1, further comprising:
a separate TLB mechanism configured to retain the effective address and a corresponding real page when a cache miss occurs.

16. A processor comprising:
a CPU; and
a cache memory,
wherein the cache memory comprises:
a TLB effective page memory configured to retain entry data including an effective page tag of predetermined high-order bits of an effective address of a process with a plurality of low-order bits including a least significant bit in the effective page tag as a first index, and output a hit signal when the effective page tag matches the effective page tag from a processor;
a data memory configured to retain cache data corresponding to the same effective page tag as the TLB effective page memory for the same entry as the first index using a second index including the first index and a page offset; and
a cache state memory configured to retain a cache state of the cache data stored in the data memory, in a manner corresponding to the second index.

17. The processor according to claim 16, wherein the data memory replaces the cache data in units of effective pages in an operating system configured to manage execution of the process.

18. The processor according to claim 16, wherein the cache state in the cache state memory is managed in units of cache blocks smaller than a page size.

19. The processor according to claim 16, further comprising:
a snoop mechanism configured to maintain coherency of the cache data in the data memory.

20. An effective address caching method, comprising:
outputting a hit signal when an effective page tag in entry data in a TLB effective page memory matches the effective page tag from a processor, the TLB effective page memory being configured to retain the entry data including the effective page tag of predetermined high-order bits of an effective address of a process with a plurality of low-order bits including a least significant bit in the effective page tag as a first index; and
when the hit signal is outputted, accessing a data memory configured to retain cache data corresponding to the same effective page tag as the TLB effective page memory for the same entry as the first index using a second index including the first index and a page offset, and a cache state memory configured to retain a cache state of the cache data stored in the data memory, in a manner corresponding to the second index.

* * * * *